United States Patent
Sun et al.

(10) Patent No.: US 11,234,239 B2
(45) Date of Patent: *Jan. 25, 2022

(54) TECHNIQUES FOR SUBBAND BASED RESOURCE ALLOCATION FOR NR-U

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/948,410

(22) Filed: Sep. 17, 2020

(65) Prior Publication Data

US 2020/0413405 A1 Dec. 31, 2020

Related U.S. Application Data

(63) Continuation of application No. 16/805,332, filed on Feb. 28, 2020, now Pat. No. 10,863,508.

(60) Provisional application No. 62/860,430, filed on Jun. 12, 2019.

(51) Int. Cl.
*H04W 72/04* (2009.01)
*H04W 16/14* (2009.01)

(52) U.S. Cl.
CPC ....... *H04W 72/0453* (2013.01); *H04W 16/14* (2013.01)

(58) Field of Classification Search
None
See application file for complete search history.

(56) References Cited

U.S. PATENT DOCUMENTS

| 9,794,899 | B2 | 10/2017 | Moon et al. |
| 10,425,199 | B2 | 9/2019 | Chen et al. |
| 10,863,508 | B1 * | 12/2020 | Sun ...................... H04L 5/0044 |

(Continued)

FOREIGN PATENT DOCUMENTS

| WO | 2018026182 A1 | 2/2018 |
| WO | 2018084571 A1 | 5/2018 |
| WO | 2019216910 A1 | 11/2019 |

OTHER PUBLICATIONS

3GPP TS 38.214, "3rd Generation Partnership Project, Technical Specification Group Radio Access Network, NR, Physical Layer Procedures for Data (Release 16)", 3GPP TS 38.214, V16.0.0, Dec. 2019, pp. 1-147.

(Continued)

*Primary Examiner* — Anh Vu H Ly
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify a subband configuration for a plurality of subbands configured for the UE, the subband configuration including one or more guard bands for the plurality of subbands. The UE may identify one or more resource blocks, in which to transmit a physical uplink shared channel (PUSCH) communication, based at least in part on the subband configuration. The UE may transmit, to a base station (BS), the PUSCH communication in the one or more resource blocks. Numerous other aspects are provided.

30 Claims, 14 Drawing Sheets

(56) References Cited

U.S. PATENT DOCUMENTS

| | | |
|---|---|---|
| 2016/0037352 A1 | 2/2016 | Wei et al. |
| 2017/0142702 A1 | 5/2017 | Yu et al. |
| 2017/0208590 A1 | 7/2017 | Kim et al. |
| 2017/0230997 A1 | 8/2017 | Damnjanovic et al. |
| 2018/0048435 A1 | 2/2018 | Islam et al. |
| 2018/0124790 A1 | 5/2018 | Yerramalli |
| 2018/0367386 A1 | 12/2018 | Liao |
| 2019/0037607 A1 | 1/2019 | Ahn et al. |
| 2019/0044689 A1 | 2/2019 | Yiu et al. |
| 2019/0124689 A1 | 4/2019 | Yang et al. |
| 2019/0158334 A1 | 5/2019 | Kim et al. |
| 2019/0159136 A1 | 5/2019 | Molavianjazi et al. |
| 2019/0229867 A1 | 7/2019 | Yi et al. |
| 2019/0260530 A1 | 8/2019 | Yi et al. |
| 2019/0274162 A1 | 9/2019 | Zhang et al. |
| 2019/0342874 A1 | 11/2019 | Davydov et al. |
| 2019/0349898 A1* | 11/2019 | Fu ..................... H04W 72/044 |
| 2020/0028640 A1* | 1/2020 | Yeo ..................... H04L 5/005 |
| 2020/0068625 A1 | 2/2020 | Zhang et al. |
| 2021/0212063 A1* | 7/2021 | Kwak ................. H04L 5/0044 |
| 2021/0235487 A1* | 7/2021 | Park ................. H04W 74/0816 |

OTHER PUBLICATIONS

International Search Report and Written Opinion—PCT/US2020/032482—ISAEPO—dated Aug. 19, 2020.
Labib M., et al., "Extending LTE into the Unlicensed Spectrum: Technical Analysis of the Proposed Variants", arXiv:1709.04458v1 [cs.NI] Sep. 13, 2017, 18 pages.
Co-pending U.S. Appl. No. 16/805,332, filed Feb. 28, 2020.

* cited by examiner

TECHNIQUES FOR SUBBAND BASED RESOURCE ALLOCATION FOR NR-U

CROSS-REFERENCE TO RELATED APPLICATIONS

This application is a continuation of U.S. patent application Ser. No. 16/805,332, filed on Feb. 28, 2020, entitled "TECHNIQUES FOR SUBBAND BASED RESOURCE ALLOCATION FOR NR-U", which claims priority to U.S. Provisional Patent Application No. 62/860,430, filed on Jun. 12, 2019, entitled "SUBBAND BASED RESOURCE ALLOCATION FOR INTERLACED PUSCH," which are hereby expressly incorporated by reference herein.

FIELD OF THE DISCLOSURE

Aspects of the present disclosure generally relate to wireless communication and to techniques for subband based resource allocation for New Radio unlicensed.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying a subband configuration for a plurality of subbands configured for the UE, the subband configuration including one or more guard bands for the plurality of subband; identifying one or more resource blocks, in which to transmit a physical uplink shared channel (PUSCH) communication, based at least in part on the subband configuration; and transmitting, to a base station (BS), the PUSCH communication in the one or more resource blocks.

In some aspects, the subband configuration is a hard coded or system-wide subband configuration for all BSs included in a wireless network in which the UE and the BS are included. In some aspects, wherein the subband configuration is to be applied to each bandwidth part configured by the BS in a cell associated with the BS. In some aspects, the subband configuration is configured for a cell of the BS; wherein the subband configuration configures all subbands and guard bands for a frequency band on which the BS operates in the cell; and wherein identifying the one or more resource blocks comprises identifying the one or more resource blocks based at least in part on the UE being served by the cell.

In some aspects, the method further comprises receiving, from the BS, an indication of the subband configuration, wherein the indication of the subband configuration is included in a cell configuration for the cell. In some aspects, the plurality of subbands are included in an unlicensed frequency band. In some aspects, identifying the one or more resource blocks comprises identifying, based at least in part on the subband configuration, a first plurality of resource blocks included in the plurality of subbands; identifying, based at least in part on an interlace of resource blocks configured for the UE, a second plurality of resource blocks for interlaced PUSCH transmissions; and identifying the one or more resource blocks as a subset of the second plurality of resource blocks that is included in the first plurality of resource blocks.

In some aspects, the one or more resource blocks are included in at least one of the plurality of subbands configured for the UE or the one or more guard bands for the plurality of subbands. In some aspects, the subband configuration is configured for a bandwidth part (BWP) of a plurality of BWPs associated with the BS; wherein the plurality of subbands and the one or more guard bands are included in the BWP; and wherein identifying the one or more resource blocks comprises identifying the one or more resource blocks based at least in part on the BWP being assigned to the UE.

In some aspects, the method further comprises receiving, from the BS, an indication of the subband configuration, wherein the indication of the subband configuration is included in a BWP configuration for the BWP. In some aspects, the subband configuration indicates respective starting resource blocks and respective ending resource blocks for each of the one or more guard bands. In some aspects, the method further comprises receiving an indication of the subband configuration from the BS; and wherein identifying the one or more resource blocks comprises identifying the one or more resource blocks based at least in part on receiving the indication of the subband configuration.

In some aspects, the subband configuration is a hard coded subband configuration or a system-wide subband configuration; and wherein identifying the one or more resource blocks comprises identifying the one or more resource blocks based at least in part on the hard coded subband configuration or the system-wide subband configuration prior to being radio resource control (RRC) configured with a cell-based subband configuration.

In some aspects, a UE for wireless communication may include memory and one or more processors operatively coupled to the memory. The memory and the one or more processors may be configured to identify a subband configuration for a plurality of subbands configured for the UE, the subband configuration including one or more guard bands for the plurality of subbands; identify one or more resource blocks, in which to transmit a PUSCH communication, based at least in part on the subband configuration; and transmit, to a BS, the PUSCH communication in the one or more resource blocks.

In some aspects, the subband configuration is a hard coded or system-wide subband configuration for all BSs included in a wireless network in which the UE and the BS are included. In some aspects, wherein the subband configuration is to be applied to each bandwidth part configured by the BS in a cell associated with the BS. In some aspects, the subband configuration is configured for a cell of the BS; wherein the subband configuration configures all subbands and guard bands for a frequency band on which the BS operates in the cell; and wherein identifying the one or more resource blocks comprises identifying the one or more resource blocks based at least in part on the UE being served by the cell.

In some aspects, the one or more processors are further configured to receive, from the BS, an indication of the subband configuration, wherein the indication of the subband configuration is included in a cell configuration for the cell. In some aspects, the plurality of subbands are included in an unlicensed frequency band. In some aspects, identifying the one or more resource blocks comprises identifying, based at least in part on the subband configuration, a first plurality of resource blocks included in the plurality of subbands; identifying, based at least in part on an interlace of resource blocks configured for the UE, a second plurality of resource blocks for interlaced PUSCH transmissions; and identifying the one or more resource blocks as a subset of the second plurality of resource blocks that is included in the first plurality of resource blocks.

In some aspects, the one or more resource blocks are included in at least one of the plurality of subbands configured for the UE or the one or more guard bands for the plurality of subbands. In some aspects, the subband configuration is configured for a BWP of a plurality of BWPs associated with the BS; wherein the plurality of subbands and the one or more guard bands are included in the BWP; and wherein identifying the one or more resource blocks comprises identifying the one or more resource blocks based at least in part on the BWP being assigned to the UE.

In some aspects, the one or more processors are further configured to receive, from the BS, an indication of the subband configuration, wherein the indication of the subband configuration is included in a BWP configuration for the BWP. In some aspects, the subband configuration indicates respective starting resource blocks and respective ending resource blocks for each of the one or more guard bands. In some aspects, the one or more processors are further configured to receive an indication of the subband configuration from the BS; and wherein identifying the one or more resource blocks comprises identifying the one or more resource blocks based at least in part on receiving the indication of the subband configuration.

In some aspects, the subband configuration is a hard coded subband configuration or a system-wide subband configuration; and wherein identifying the one or more resource blocks comprises identifying the one or more resource blocks based at least in part on the hard coded subband configuration or the system-wide subband configuration prior to being RRC configured with a cell-based subband configuration.

In some aspects, a non-transitory computer-readable medium may store one or more instructions for wireless communication. The one or more instructions, when executed by one or more processors of a UE, may cause the one or more processors to identify a subband configuration for a plurality of subbands configured for the UE, the subband configuration including one or more guard bands for the plurality of subbands; identify one or more resource blocks, in which to transmit a PUSCH communication, based at least in part on the subband configuration; and transmit, to a BS, the PUSCH communication in the one or more resource blocks.

In some aspects, the subband configuration is a hard coded or system-wide subband configuration for all BSs included in a wireless network in which the UE and the BS are included. In some aspects, wherein the subband configuration is to be applied to each bandwidth part configured by the BS in a cell associated with the BS. In some aspects, the subband configuration is configured for a cell of the BS; wherein the subband configuration configures all subbands and guard bands for a frequency band on which the BS operates in the cell; and wherein identifying the one or more resource blocks comprises identifying the one or more resource blocks based at least in part on the UE being served by the cell.

In some aspects, the one or more instructions, when executed by the one or more processors, further cause the one or more processors to receive, from the BS, an indication of the subband configuration, wherein the indication of the subband configuration is included in a cell configuration for the cell. In some aspects, the plurality of subbands are included in an unlicensed frequency band. In some aspects, identifying the one or more resource blocks comprises identifying, based at least in part on the subband configuration, a first plurality of resource blocks included in the plurality of subbands; identifying, based at least in part on an interlace of resource blocks configured for the UE, a second plurality of resource blocks for interlaced PUSCH transmissions; and identifying the one or more resource blocks as a subset of the second plurality of resource blocks that is included in the first plurality of resource blocks.

In some aspects, the one or more resource blocks are included in at least one of the plurality of subbands configured for the UE or the one or more guard bands for the plurality of subbands. In some aspects, the subband configuration is configured for a BWP of a plurality of BWPs associated with the BS; wherein the plurality of subbands and the one or more guard bands are included in the BWP; and wherein identifying the one or more resource blocks comprises identifying the one or more resource blocks based at least in part on the BWP being assigned to the UE.

In some aspects, the one or more instructions, when executed by the one or more processors, further cause the one or more processors to receive, from the BS, an indication of the subband configuration, wherein the indication of the subband configuration is included in a BWP configuration for the BWP. In some aspects, the subband configuration indicates respective starting resource blocks and respective ending resource blocks for each of the one or more guard bands. In some aspects, the one or more instructions, when executed by the one or more processors, further cause the one or more processors to receive an indication of the subband configuration from the BS; and wherein identifying the one or more resource blocks comprises identifying the one or more resource blocks based at least in part on receiving the indication of the subband configuration.

In some aspects, the subband configuration is a hard coded subband configuration or a system-wide subband configuration; and wherein identifying the one or more resource blocks comprises identifying the one or more resource blocks based at least in part on the hard coded subband configuration or the system-wide subband configuration prior to being radio resource control (RRC) configured with a cell-based subband configuration.

In some aspects, an apparatus for wireless communication may include means for identifying a subband configuration for a plurality of subbands configured for the apparatus, the subband configuration including one or more guard bands for the plurality of subbands; means for identifying one or more resource blocks, in which to transmit a PUSCH communication, based at least in part on the subband configuration; and means for transmitting, to a BS, the PUSCH communication in the one or more resource blocks.

In some aspects, the subband configuration is a hard coded or system-wide subband configuration for all BSs included in a wireless network in which the apparatus and the BS are included. In some aspects, wherein the subband configuration is to be applied to each bandwidth part configured by the BS in a cell associated with the BS. In some aspects, the subband configuration is configured for a cell of the BS; wherein the subband configuration configures all subbands and guard bands for a frequency band on which the BS operates in the cell; and wherein identifying the one or more resource blocks comprises identifying the one or more resource blocks based at least in part on the apparatus being served by the cell.

In some aspects, the apparatus further comprises means for receiving, from the BS, an indication of the subband configuration, wherein the indication of the subband configuration is included in a cell configuration for the cell. In some aspects, the plurality of subbands are included in an unlicensed frequency band. In some aspects, identifying the one or more resource blocks comprises identifying, based at least in part on the subband configuration, a first plurality of resource blocks included in the plurality of subbands; identifying, based at least in part on an interlace of resource blocks configured for the apparatus, a second plurality of resource blocks for interlaced PUSCH transmissions; and identifying the one or more resource blocks as a subset of the second plurality of resource blocks that is included in the first plurality of resource blocks.

In some aspects, the one or more resource blocks are included in at least one of the plurality of subbands configured for the apparatus or the one or more guard bands for the plurality of subbands. In some aspects, the subband configuration is configured for a BWP of a plurality of BWPs associated with the BS; wherein the plurality of subbands and the one or more guard bands are included in the BWP; and wherein identifying the one or more resource blocks comprises identifying the one or more resource blocks based at least in part on the BWP being assigned to the apparatus.

In some aspects, the apparatus further comprises means for receiving, from the BS, an indication of the subband configuration, wherein the indication of the subband configuration is included in a BWP configuration for the BWP. In some aspects, the subband configuration indicates respective starting resource blocks and respective ending resource blocks for each of the one or more guard bands. In some aspects, the apparatus further comprises means for receiving an indication of the subband configuration from the BS; and wherein identifying the one or more resource blocks comprises identifying the one or more resource blocks based at least in part on receiving the indication of the subband configuration.

In some aspects, the subband configuration is a hard coded subband configuration or a system-wide subband configuration; and wherein identifying the one or more resource blocks comprises identifying the one or more resource blocks based at least in part on the hard coded subband configuration or the system-wide subband configuration prior to being RRC configured with a cell-based subband configuration.

In some aspects, a method of wireless communication, performed by a BS, may include configuring a subband configuration that includes one or more guard bands for a plurality of subbands configured for a UE; and transmitting, to the UE, an indication of the subband configuration.

In some aspects, configuring the subband configuration for the cell comprises configuring the subband configuration for each bandwidth part configured by the BS in a cell associated with the BS. In some aspects, configuring the subband configuration comprises configuring the subband configuration for a cell of the BS, wherein configuring the subband configuration for the cell comprises configuring the subband configuration for all subbands and guard bands for a frequency band on which the BS operates in the cell. In some aspects, transmitting the indication of the subband configuration comprises transmitting the indication of the subband configuration in a cell configuration for the cell.

In some aspects, the plurality of subbands are included in an unlicensed frequency band. In some aspects, the method further comprises receiving, from the UE, a PUSCH communication in one or more resource blocks that are based at least in part on the plurality of subbands configured for the UE and the subband configuration. In some aspects, the one or more resource blocks are included in at least one of the plurality of subbands configured for the UE or the one or more guard bands for the plurality of subbands. In some aspects, configuring the subband configuration comprises configuring the subband configuration for a BWP of a plurality of BWPs associated with the BS.

In some aspects, transmitting the indication of the subband configuration comprises transmitting the indication of the subband configuration in a BWP configuration for the BWP. In some aspects, the subband configuration indicates respective starting resource blocks and respective ending resource blocks for each of the one or more guard bands. In some aspects, the subband configuration is included in a plurality of subband configurations that is configured for the UE, wherein the plurality of subband configurations comprise a combination of at least one of a hard coded or system-wide subband configuration, a cell-based subband configuration, a BWP-based subband configuration, or a subband combination-based subband configuration.

In some aspects, a BS for wireless communication may include memory and one or more processors operatively coupled to the memory. The memory and the one or more processors may be configured to configure a subband configuration that includes one or more guard bands for a plurality of subbands configured for a UE; and transmit, to the UE, an indication of the subband configuration.

In some aspects, configuring the subband configuration for the cell comprises configuring the subband configuration for each bandwidth part configured by the BS in a cell associated with the BS. In some aspects, configuring the subband configuration comprises configuring the subband configuration for a cell of the BS, wherein configuring the subband configuration for the cell comprises configuring the subband configuration for all subbands and guard bands for a frequency band on which the BS operates in the cell. In some aspects, transmitting the indication of the subband configuration comprises transmitting the indication of the subband configuration in a cell configuration for the cell.

In some aspects, the plurality of subbands are included in an unlicensed frequency band. In some aspects, the one or more processors are further configured to receive, from the UE, a PUSCH communication in one or more resource blocks that are based at least in part on the plurality of subbands configured for the UE and the subband configuration. In some aspects, the one or more resource blocks are included in at least one of the plurality of subbands configured for the UE or the one or more guard bands for the plurality of subbands. In some aspects, configuring the subband configuration comprises configuring the subband configuration for a BWP of a plurality of BWPs associated with the BS.

In some aspects, transmitting the indication of the subband configuration comprises transmitting the indication of the subband configuration in a BWP configuration for the BWP. In some aspects, the subband configuration indicates respective starting resource blocks and respective ending resource blocks for each of the one or more guard bands. In some aspects, the subband configuration is included in a plurality of subband configurations that is configured for the UE, wherein the plurality of subband configurations comprise a combination of at least one of a hard coded or system-wide subband configuration, a cell-based subband configuration, a BWP-based subband configuration, or a subband combination-based subband configuration.

In some aspects, a non-transitory computer-readable medium may store one or more instructions for wireless communication. The one or more instructions, when executed by one or more processors of a BS, may cause the one or more processors to configure a subband configuration that includes one or more guard bands for a plurality of subbands configured for a UE; and transmit, to the UE, an indication of the subband configuration.

In some aspects, configuring the subband configuration for the cell comprises configuring the subband configuration for each bandwidth part configured by the BS in a cell associated with the BS. In some aspects, configuring the subband configuration comprises configuring the subband configuration for a cell of the BS, wherein configuring the subband configuration for the cell comprises configuring the subband configuration for all subbands and guard bands for a frequency band on which the BS operates in the cell. In some aspects, transmitting the indication of the subband configuration comprises transmitting the indication of the subband configuration in a cell configuration for the cell.

In some aspects, the plurality of subbands are included in an unlicensed frequency band. In some aspects, the one or more instructions, when executed by the one or more processors, further cause the one or more processors to receive, from the UE, a PUSCH communication in one or more resource blocks that are based at least in part on the plurality of subbands configured for the UE and the subband configuration. In some aspects, the one or more resource blocks are included in at least one of the plurality of subbands configured for the UE or the one or more guard bands for the plurality of subbands. In some aspects, configuring the subband configuration comprises configuring the subband configuration for a BWP of a plurality of BWPs associated with the BS.

In some aspects, transmitting the indication of the subband configuration comprises transmitting the indication of the subband configuration in a BWP configuration for the BWP. In some aspects, the subband configuration indicates respective starting resource blocks and respective ending resource blocks for each of the one or more guard bands. In some aspects, the subband configuration is included in a plurality of subband configurations that is configured for the UE, wherein the plurality of subband configurations comprise a combination of at least one of a hard coded or system-wide subband configuration, a cell-based subband configuration, a BWP-based subband configuration, or a subband combination-based subband configuration.

In some aspects, an apparatus for wireless communication may include means for configuring a subband configuration that includes one or more guard bands for a plurality of subbands configured for a UE; and means for transmitting, to the UE, an indication of the subband configuration.

In some aspects, configuring the subband configuration for the cell comprises configuring the subband configuration for each bandwidth part configured by the BS in a cell associated with the BS. In some aspects, configuring the subband configuration comprises configuring the subband configuration for a cell of the BS, wherein configuring the subband configuration for the cell comprises configuring the subband configuration for all subbands and guard bands for a frequency band on which the BS operates in the cell. In some aspects, transmitting the indication of the subband configuration comprises transmitting the indication of the subband configuration in a cell configuration for the cell.

In some aspects, the plurality of subbands are included in an unlicensed frequency band. In some aspects, the apparatus further comprises means for receiving, from the UE, a PUSCH communication in one or more resource blocks that are based at least in part on the plurality of subbands configured for the UE and the subband configuration. In some aspects, the one or more resource blocks are included in at least one of the plurality of subbands configured for the UE or the one or more guard bands for the plurality of subbands. In some aspects, configuring the subband configuration comprises configuring the subband configuration for a BWP of a plurality of BWPs associated with the BS.

In some aspects, transmitting the indication of the subband configuration comprises transmitting the indication of the subband configuration in a BWP configuration for the BWP. In some aspects, the subband configuration indicates respective starting resource blocks and respective ending resource blocks for each of the one or more guard bands. In some aspects, the subband configuration is included in a plurality of subband configurations that is configured for the UE, wherein the plurality of subband configurations comprise a combination of at least one of a hard coded or system-wide subband configuration, a cell-based subband configuration, a BWP-based subband configuration, or a subband combination-based subband configuration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
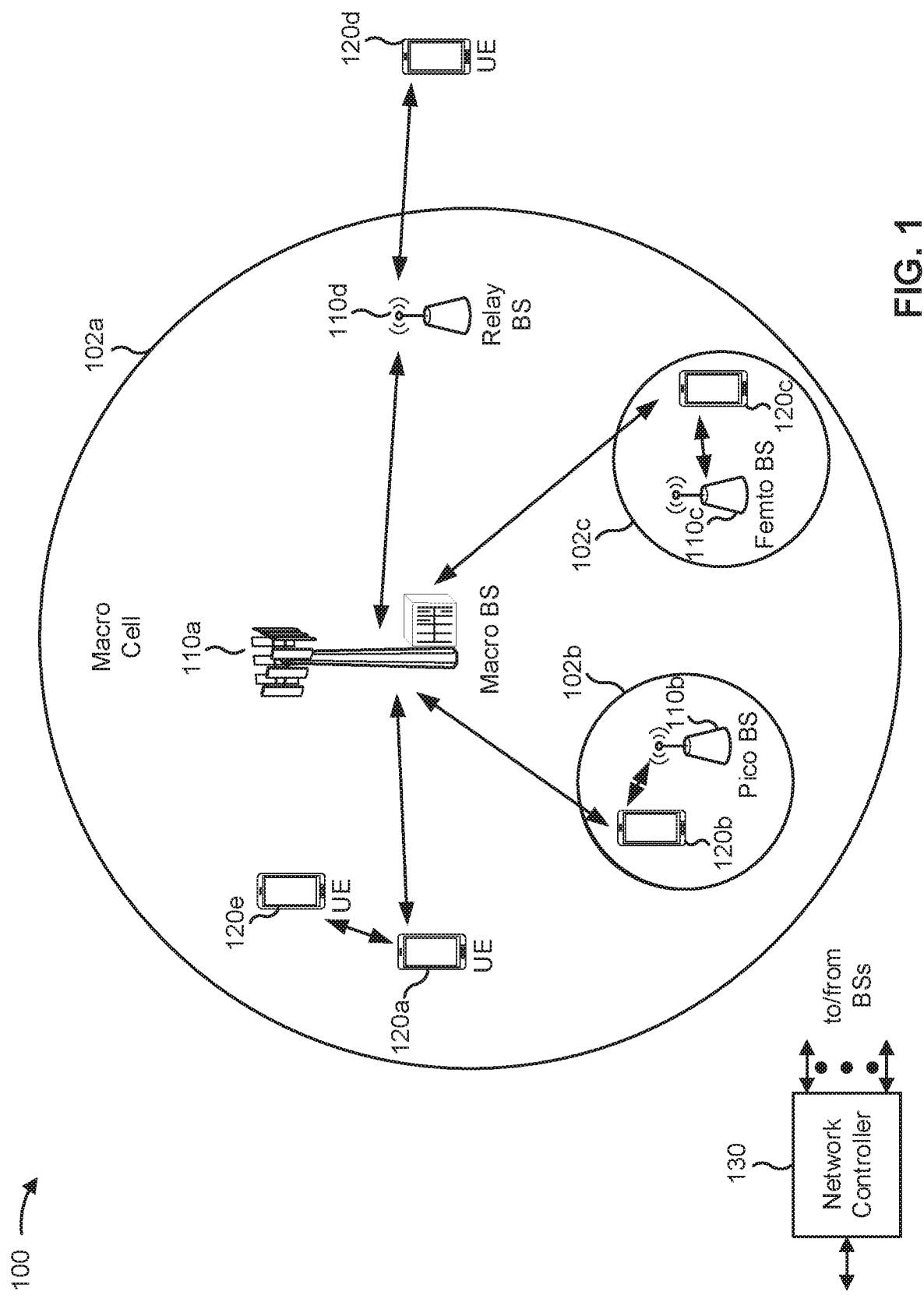
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
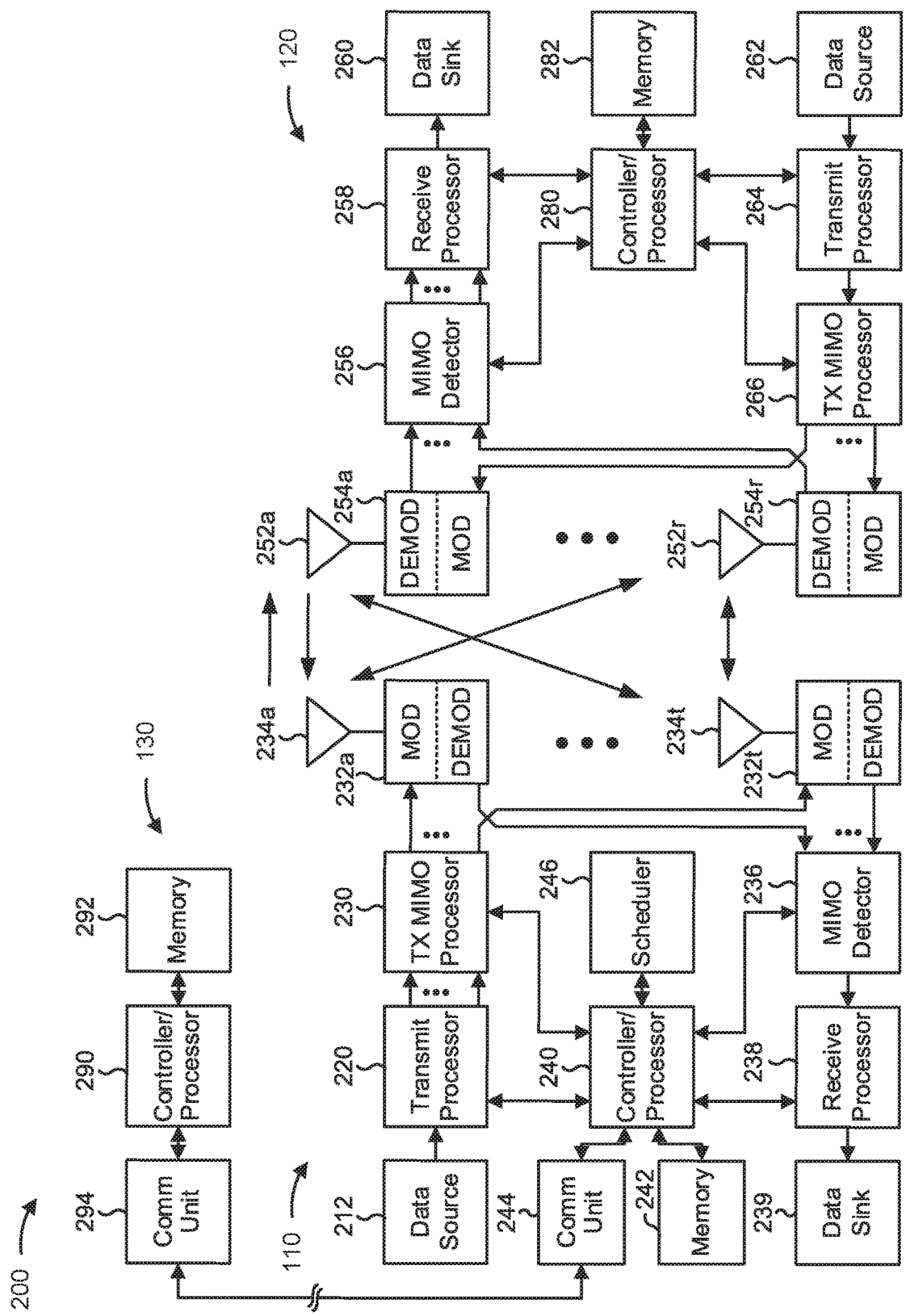
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with subband based resource allocation for New Radio unlicensed (NR-U), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying a subband configuration for a plurality of subbands configured for the UE 120, the subband configuration including one or more guard bands for the plurality of subbands, means for identifying one or more resource blocks, in which to transmit a PUSCH communication, based at least in part on the subband configuration, means for transmitting, to a base station 110, the PUSCH communication in the one or more resource blocks, and/or the like. In some aspects, such means may include one or more components of UE 120 described in connection with FIG. 2.

In some aspects, base station 110 may include means for configuring a subband configuration that includes one or more guard bands for a plurality of subbands configured to a UE 120, means for transmitting, to the UE 120, an indication of the subband configuration, and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
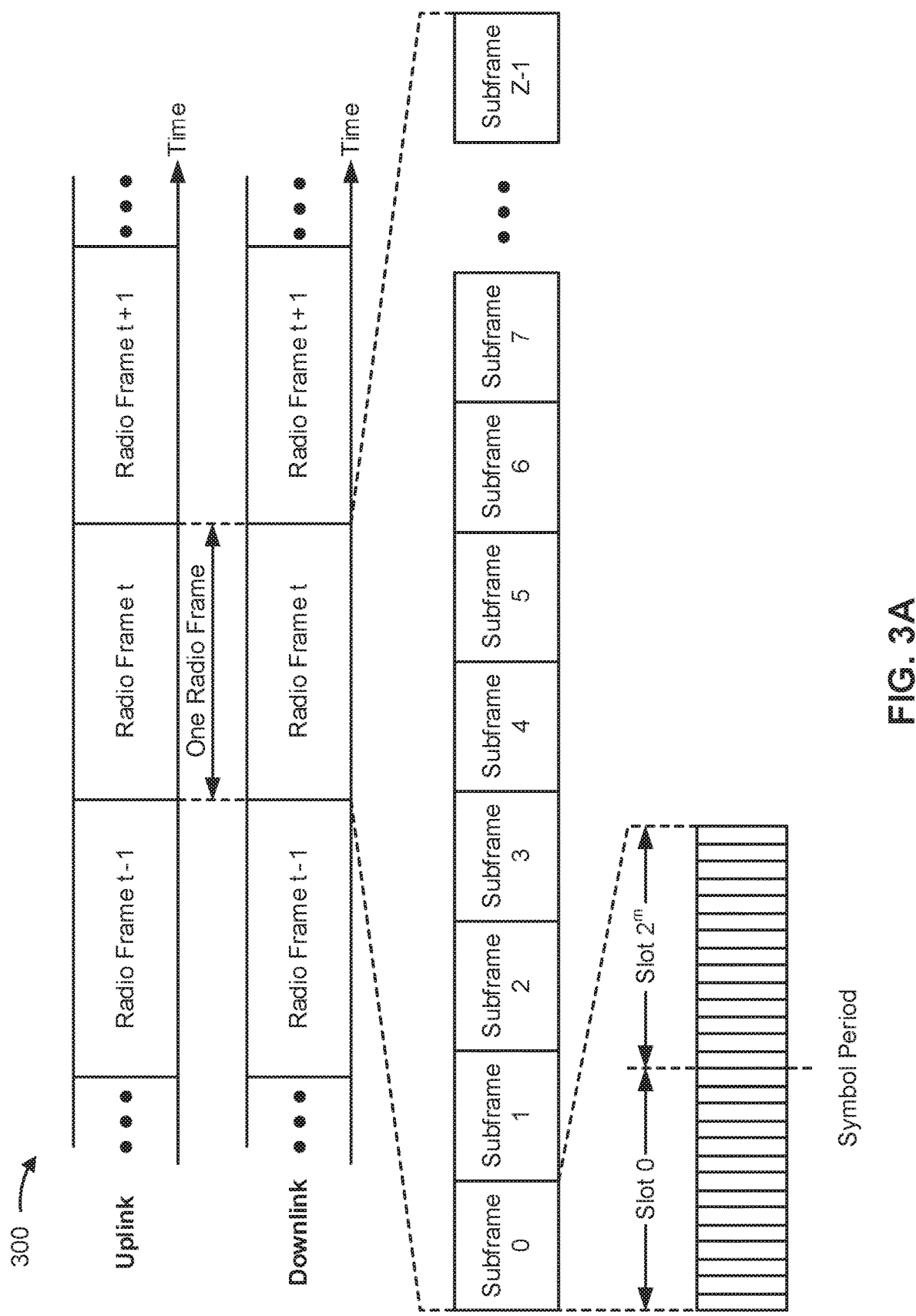
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
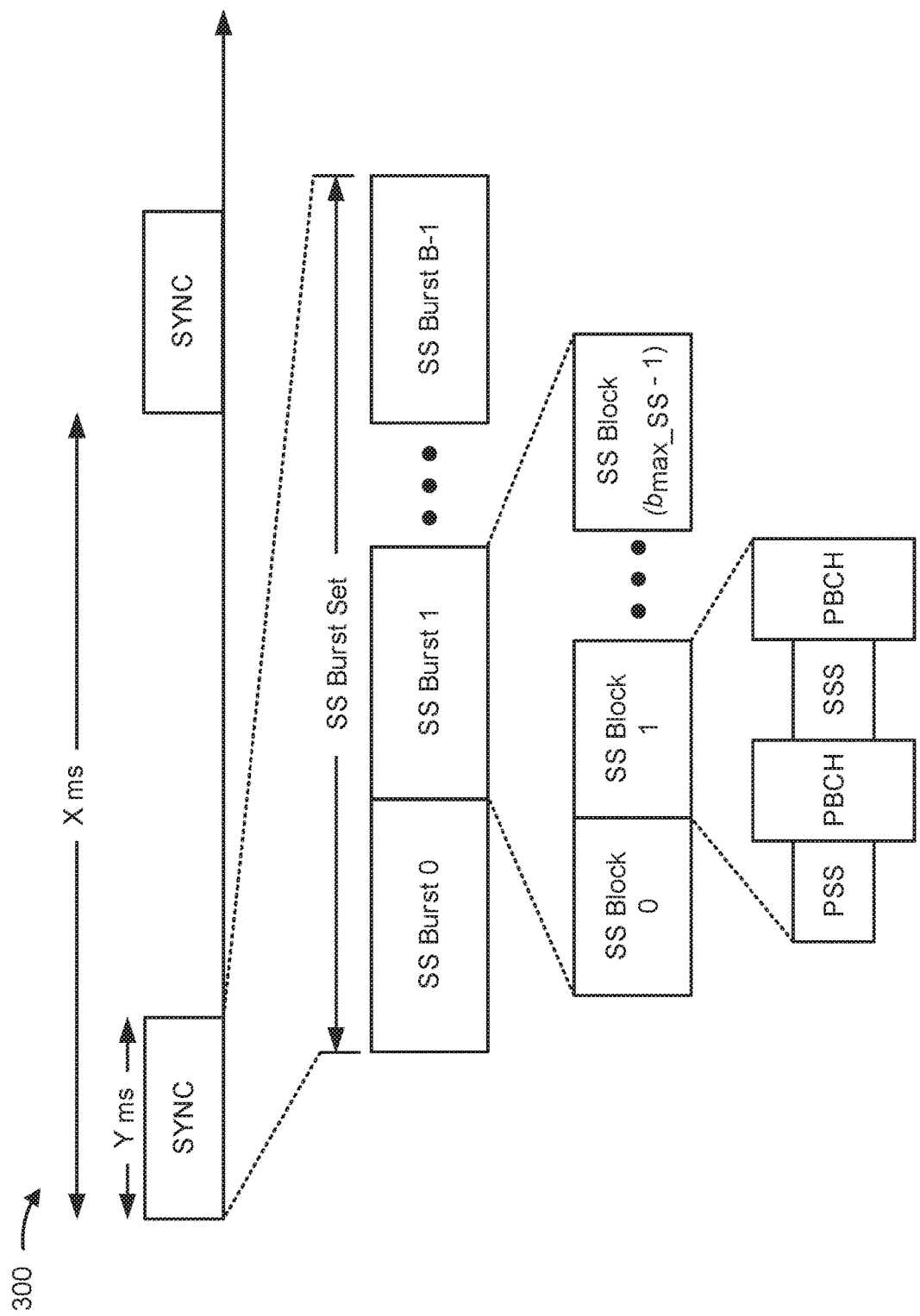
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
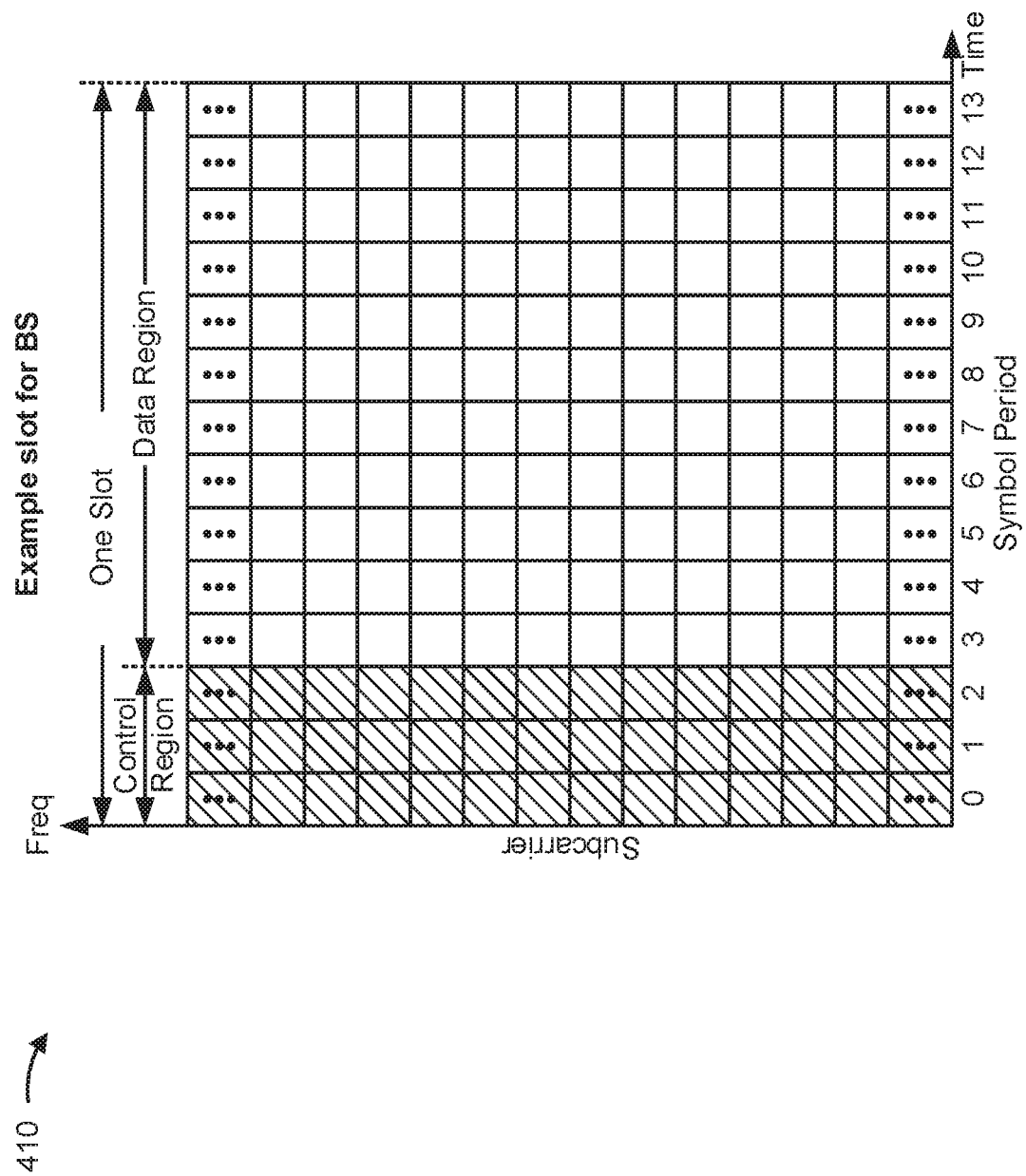
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$. As another example, R interlaces may be defined, where R may be equal to 5, 10, or some other value based at least in part on subcarrier spacing of slot format 410 (e.g., 5 for 30 KHz subcarrier spacing, 10 for 15 KHz subcarrier spacing, and/or the like). Each interlace may include resource blocks, for PUSCH transmissions, that are spaced apart by R resource blocks in the frequency domain. In particular, interlace r may include resource blocks r, r+R, r+2R, etc., where $r \in \{0, \ldots, R-1\}$. As an example, for 5 interlaces of resource blocks, a first interlace may include resource block 0, 5, 10, 15, and so on, a second interlace may include resource block 1, 6, 11, 15, and so on, a third interlace may include resource block 2, 7, 12, 16, and so on, and/or the like.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting nonbackward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

As indicated above, various interlaces of resource blocks for PUSCH transmissions may be defined for various types of wireless network deployments, such as a 5G/NR deployment. In some cases, the resource blocks included in an interlace may be dispersed across a plurality of frequency domain resources (e.g., subbands, channels, and/or the like). In this case, a UE may identify the resource blocks, that may be used for transmitting a PUSCH communication to a BS, based at least in part on a frequency domain resource allocation assigned to the UE and an interlace allocated to the UE. In other words, the UE may identify the resource blocks, included in the allocated interlace, that fall within the subbands or channels of the frequency domain resource allocation assigned to the UE.

In some cases, the subbands and associated guard bands that may be allocated to the UE may be included in a well-defined structure (e.g., length and location), such as for a 5G/NR deployment in a licensed frequency band. However, for an NR-U deployment, subband and guard band length (e.g., in resource blocks) and/or location may be based at least in part on an unlicensed and/or shared frequency band used in the deployment, may be based at least in part on a channelization of another type of wireless access method (e.g., Wi-Fi channelization), may be based at least in part on interference requirements for the unlicensed frequency band, may be dynamic and/or configurable by BSs in the deployment, and/or the like. As a result, the UE may be unable to determine the length and/or locations of subbands and/or guard bands for a frequency domain resource allocation assigned to the UE, which in turn may result in the UE being unable to identify the resource blocks that may be used for transmitting physical uplink shared channel (PUSCH) communications.

Some aspects described herein provide techniques and apparatuses for subband based resource allocation for NR-U. A UE may identify one or more resource blocks, in which to transmit a PUSCH communication, based at least in part on a subband configuration for a plurality of subbands configured for the UE. The subband configuration may indicate and/or include one or more guard bands for the plurality of subbands allocated to the UE, as well as other parameters for the plurality of subbands and/or one or more guard bands. The subband configuration may be hard coded or configured system-wide for all subbands across a particular frequency band (e.g., an unlicensed frequency band in an NR-U deployment) or all frequency bands included in a wireless network, may be configured for all subbands on a cell-basis for each BS in the wireless network, may be configured per bandwidth part (BWP) associated with a BS, may be configured for different combinations of subbands, and/or the like. In this way, the UE is permitted to use the subband configuration to identify the length and/or locations of subbands and/or guard bands for a frequency domain resource allocation assigned to the UE (e.g., in an unlicensed frequency band deployment), which in turn permits the UE to identify the resource blocks that may be used for transmitting PUSCH communications.

FIGS. 5A-5E are diagrams illustrating one or more examples 500 of subband based resource allocation for NR-U, in accordance with various aspects of the present disclosure. As shown in FIGS. 5A-5E, examples 500 may include communication between a BS (e.g., BS 110) and a UE (e.g., UE 120). In some aspects, the BS and the UE may be included in a wireless network (e.g., wireless network 100).

In some aspects, the BS and the UE may be configured to communicate in the wireless network using various frequency bands, such as one or more licensed frequency bands, one or more unlicensed and/or shared frequency bands, and/or the like. Examples of unlicensed and/or shared frequency bands may include industrial, scientific, and medical (ISM) radio frequency bands, such as 2.4 GHz and 5 GHz (which may typically be used for Wi-Fi communication), and/or the like. To permit cellular communication using an unlicensed and/or shared frequency band, the unlicensed and/or shared frequency band may be configured into subbands. The subbands may be guard banded to provide some protection against radio frequency (RF) interference caused by transmissions in adjacent subbands.

In some aspects, a subband configuration may be hard coded or configured system-wide for an entire unlicensed and/or shared frequency band for all BSs in the wireless network, may be hard coded or configured system-wide for all unlicensed and/or shared frequency bands that are permitted to be operated in the wireless network, and/or the like. A subband configuration may include, specify, and/or indicate one or more subbands, one or more guard bands associated with each subband (e.g., the locations of the one or more guard bands, the length or bandwidth of the one or more guard bands, and/or the like), and/or the like. The subband configuration may indicate the number of resource blocks included in each subband, may indicate the locations of the one or more subbands (e.g., a starting resource block and ending resource block for each subband), and/or the like. The subband configuration may indicate the number of resource blocks included in each guard band, may indicate the locations of the one or more guard bands (e.g., a starting resource block and ending resource block for each guard band), and/or the like.

A subband configuration may be hard coded or configured system-wide for an entire unlicensed and/or shared frequency band for all BSs in the wireless network such that the subband configuration configures all subbands and guard bands for the unlicensed and/or shared frequency band. In this case, all BSs in the wireless network may use the same subband configuration for the unlicensed and/or shared frequency band. As another example, a subband configuration may be hard coded or configured system-wide for all unlicensed and/or shared frequency bands for all BSs in the wireless network such that the subband configuration configures all subbands and guard bands for all unlicensed and/or shared frequency bands in the wireless network. In this case, all BSs in the wireless network may use the same subband configuration for all unlicensed and/or shared frequency bands that are permitted to be operated in the wireless network.

In some aspects, a subband configuration may be hard coded or configured system-wide for an unlicensed and/or shared frequency band across the entire wireless network in cases where, for example, a channel structure that is configured for other types of communication (e.g., Wi-Fi communication) is reused for cellular communication on the unlicensed and/or shared frequency band. For example, if the BS and the UE communicate via 5 GHz, the BS and the UE (as well as other BSs and UEs in the wireless network) may reuse the channels (e.g., channel frequencies and bandwidths) and guard bands, that are configured for Wi-Fi communication, as the subbands and guard bands for cellular communication using the 5 GHz frequency band. Examples of channel bandwidths of an unlicensed and/or shared frequency band channel may include 20 MHz, 80 Mhz, 100 Mhz, and/or the like.

Figure 5A:
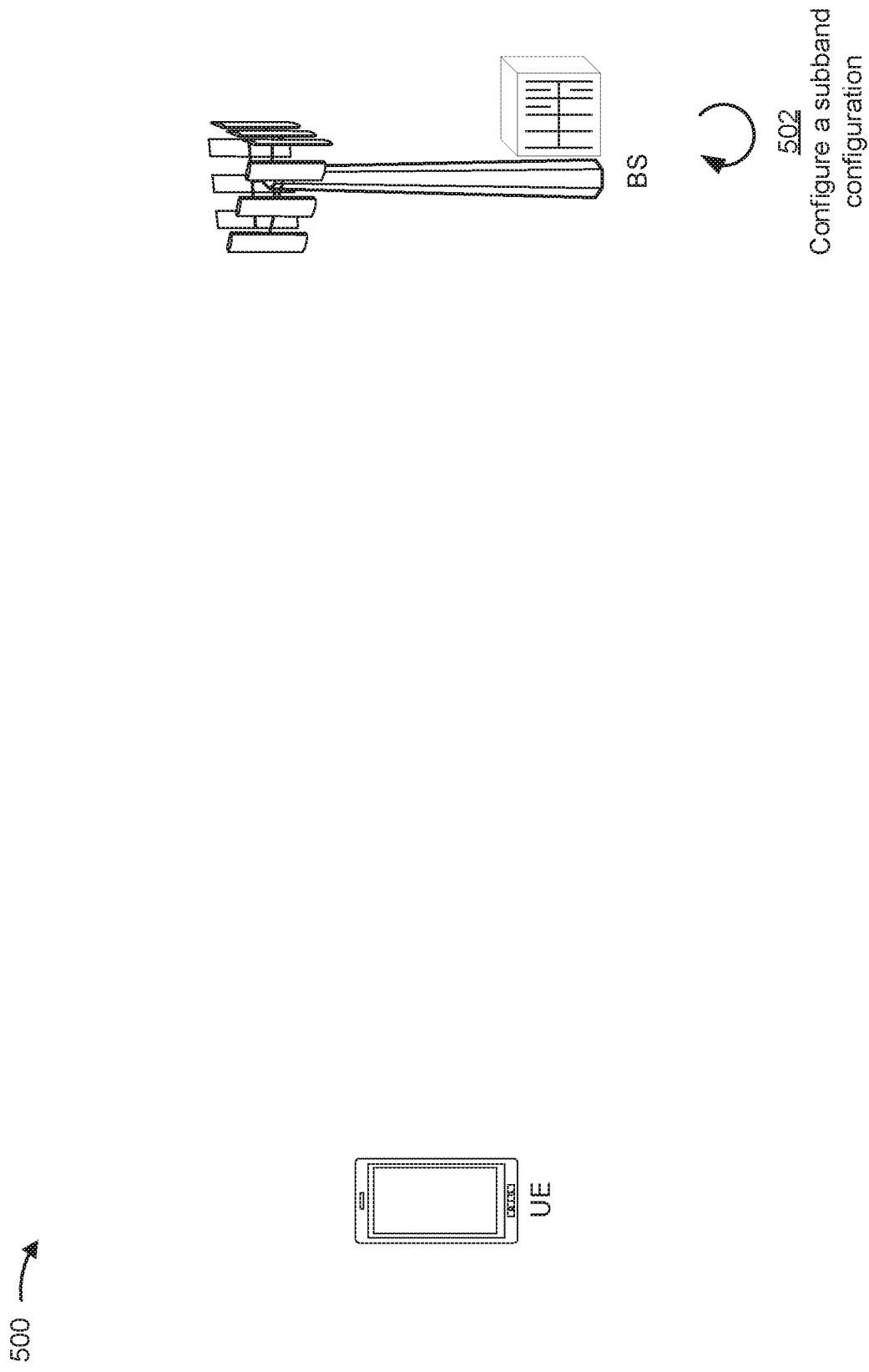
FIGS. 5A-5E are diagrams illustrating one or more examples of subband based resource allocation for New Radio unlicensed, in accordance with various aspects of the present disclosure.

As shown in FIG. 5A, and by reference number 502, in some aspects, additionally and/or alternatively to the subband configuration being hard coded or configured system-wide for the entire wireless network, the BS may configure a cell-based subband configuration (e.g., a subband configuration specific to a cell), a BWP-based subband configuration (e.g., a subband configuration specific to a BWP of a cell), a subband combination-based subband configuration (e.g., a subband configuration specific to a combination of subbands of an unlicensed and/or shared frequency band), and/or the like. In this way, the BS (and other BSs in the wireless network) is permitted to flexibly configure subband configurations (e.g., the same subband configuration, different subband configurations, and/or the like) for different cells of the BS, for different BWPs of each cell, for different combinations of subbands in each cell, and/or the like.

In some aspects, the BS may configure one or more combinations of subband configuration types for one or more UEs. For example, in addition to a hard coded or system-wide subband configuration, the BS may configure a cell-based subband configuration, a BWP-based subband configuration, and/or a subband combination-based subband configuration for the one or more UEs. In this case, the one or more UEs may use the hard coded or system-wide subband configuration prior to being RRC configured by the BS, and may use the cell-based subband configuration, a BWP-based subband configuration, and/or a subband combination-based subband configuration after being RRC configured. As another example, the BS may configure a cell-based subband configuration, which may be configured for the one or more UEs to use as a default or baseline subband configuration (e.g., and thus, may be transmitted in a SIB and/or another type of system information), and then UEs may be RRC configured with UE-specific subband configurations (e.g., a BWP-based subband configuration, a subband combination-based subband configuration, and/or the like).

Figure 5B:
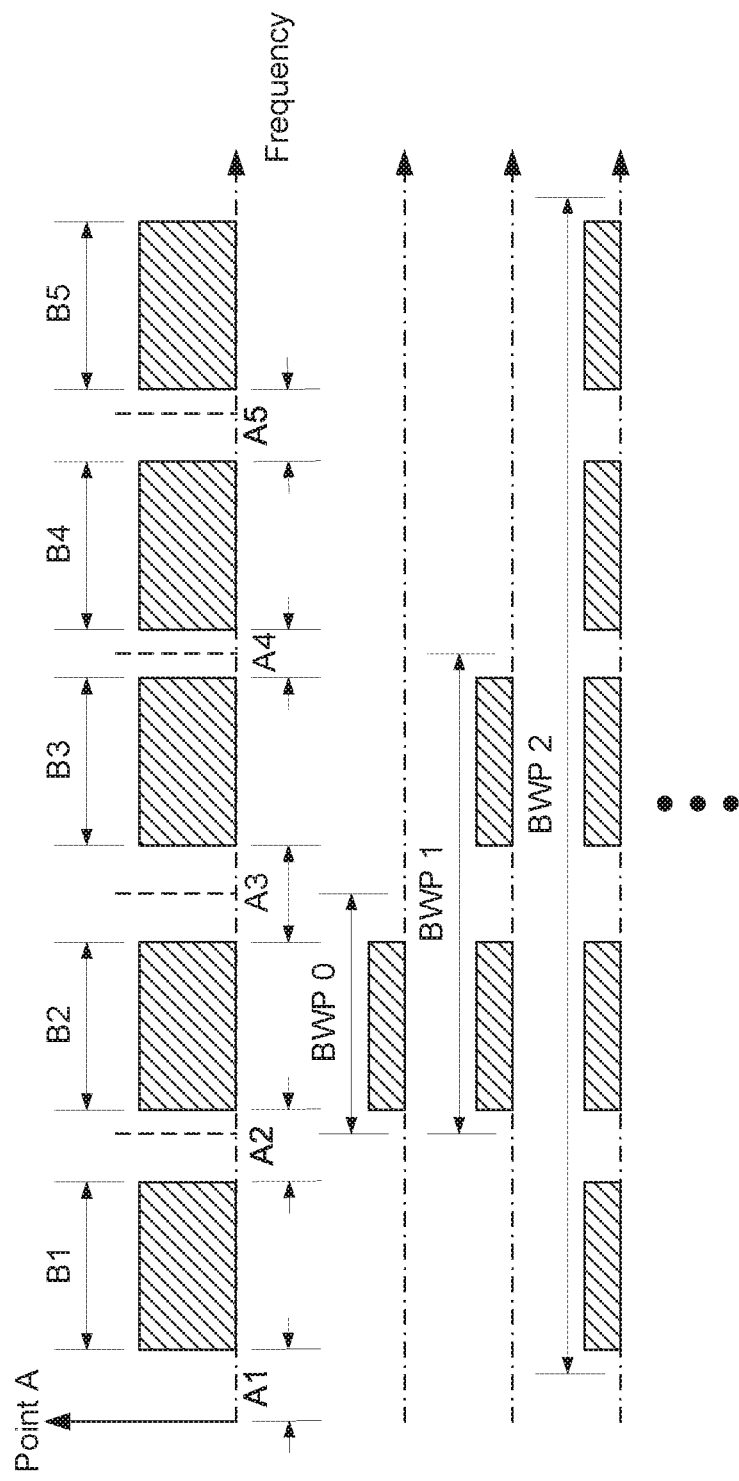

FIG. 5B illustrates an example of a cell-based subband configuration. Other cell-based subband configurations may be implemented. As shown in FIG. 5B, the cell-based subband configuration may configure a plurality of subbands (e.g., subbands B1-B5) and a plurality of associated guard bands (e.g., guard bands A1-A5) for an unlicensed and/or shared frequency band that is operated in a cell associated with the BS. In some aspects, the BS may define the plurality of subbands and the plurality of guard bands (e.g., the respective starting resource blocks and the respective ending blocks for the plurality of subbands and the plurality of guard bands) starting from a reference frequency or physical resource block of the unlicensed and/or shared frequency band. The reference frequency or physical resource block may be referred to as a common reference point or Point A.

In some aspects, the configuration of the plurality of subbands and the plurality of guard-bands in the subband configuration may be applied to all BWPs configured by the BS in the cell. For example, FIG. 5B illustrates various example BWPs configured for the BS (e.g., BWP 0-2). As shown in FIG. 5B, BWP 0 may include subband B2 and guard bands A2 and A3 from the cell-based subband configuration, BWP 1 may include subbands B2 and B3 and guard bands A2-A4 from the cell-based subband configuration, BWP 2 may include subbands B1-B5 and guard bands A1-A5 from the cell-based subband configuration, and so on.

Moreover, as shown in FIG. 5B, the length and locations of the subbands and the guard bands in each BWP may be carried over from the cell-based subband configuration. In other words, the length and location of subband B2 may be the same for BWP 0, BWP 1, and BWP2; the length and location of guard band A2 may be the same for BWP 0, BWP 1, and BWP2; and so on.

Figure 5C:
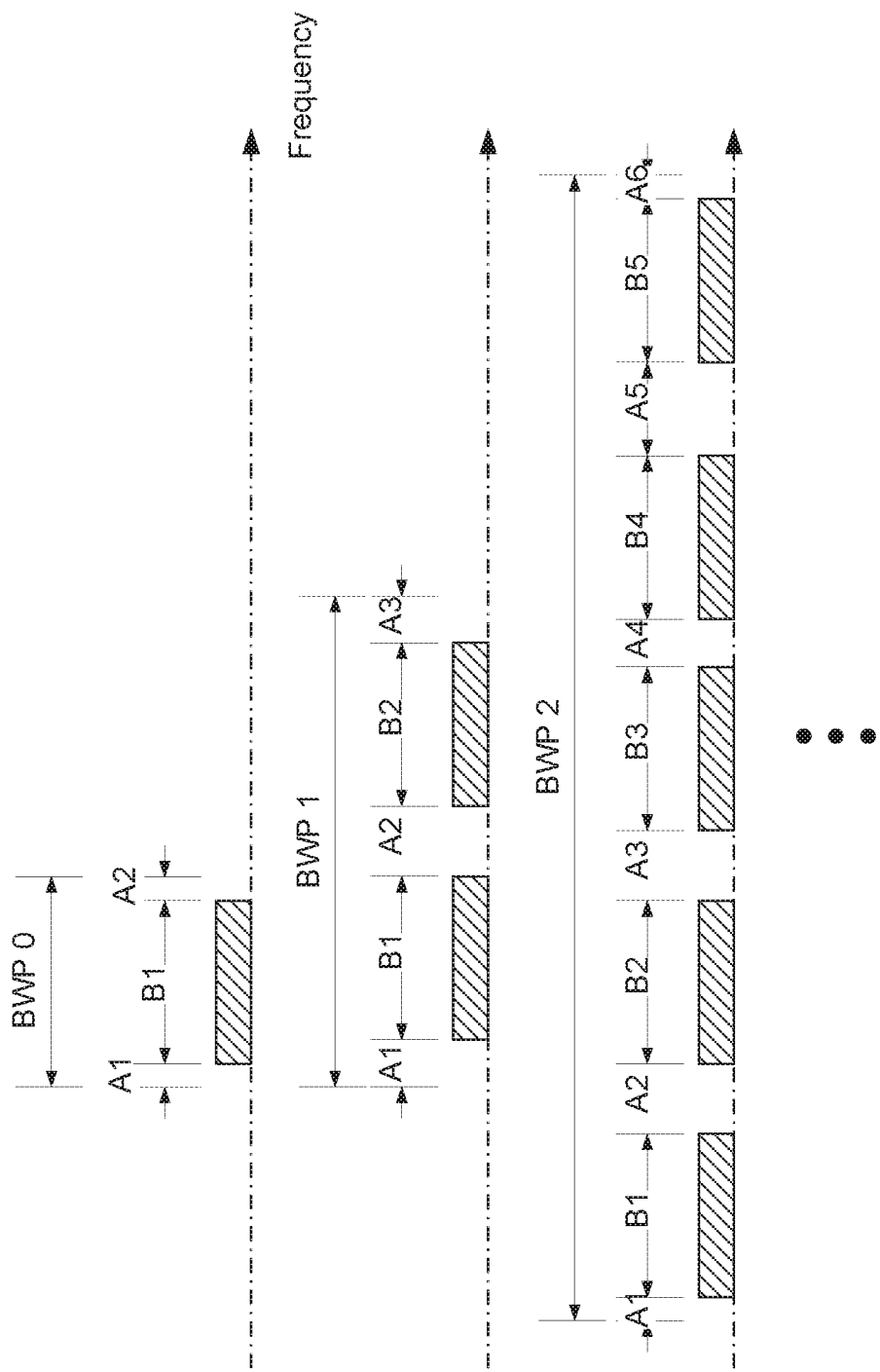

FIG. 5C illustrates an example of a BWP-based subband configuration. Other BWP-based subband configurations may be implemented. As shown in FIG. 5C, the BWP-based subband configuration may configure a plurality of BWPs for a cell associated with the BS. Each BWP may be configured with one or more subbands and one or more associated guard bands for an unlicensed and/or shared frequency band that is operated in a cell associated with the BS. In some aspects, a BWP-based subband configuration may configure a single BWP. In this case, the BS may configure respective BWP-based subband configurations for each BWP associated with the BS. In some aspects, a BWP-based subband configuration may configure one or more BWPs that are assigned to the UE. In this case, the BS may configure respective BWP-based subband configurations for each UE that communicatively connects with the BS.

In some aspects, the configuration of subbands and guard-bands in the subband configuration for each BWP may be the same configuration or different configurations. In this case, one or more of subbands B1-B5 in a first BWP may be a different length and/or at a different location in an unlicensed and/or shared frequency band relative to one or more of subbands B1-B5 in a second BWP or may be the same length and/or location as one or more of subbands B1-B5 in the second BWP. Similarly, one or more of guard bands A1-A6 in a first BWP may be a different length and/or at a different location in an unlicensed and/or shared frequency band relative to one or more of guard bands A1-A6 in a second BWP or may be the same length and/or location as one or more of guard bands A1-A6 in the second BWP.

For example, FIG. 5C illustrates various example BWPs configured for the BS (e.g., BWP 0-2). The BWPs may be configured in respective BWP-based subband configurations or the same BWP-based subband configuration. As shown in FIG. 5C, BWP 0 may include a subband B1 and guard bands A1 and A2, BWP 1 may include subbands B1 and B1 and guard bands A1-A3, BWP 2 may include subbands B1-B5 and guard bands A1-A6, and so on. Moreover, the locations of subband B1 and B2 may be different across BWPs 0-2, the locations of guard bands A1-A3 may be different across BWPs 0-2, and so on.

Figure 5D:
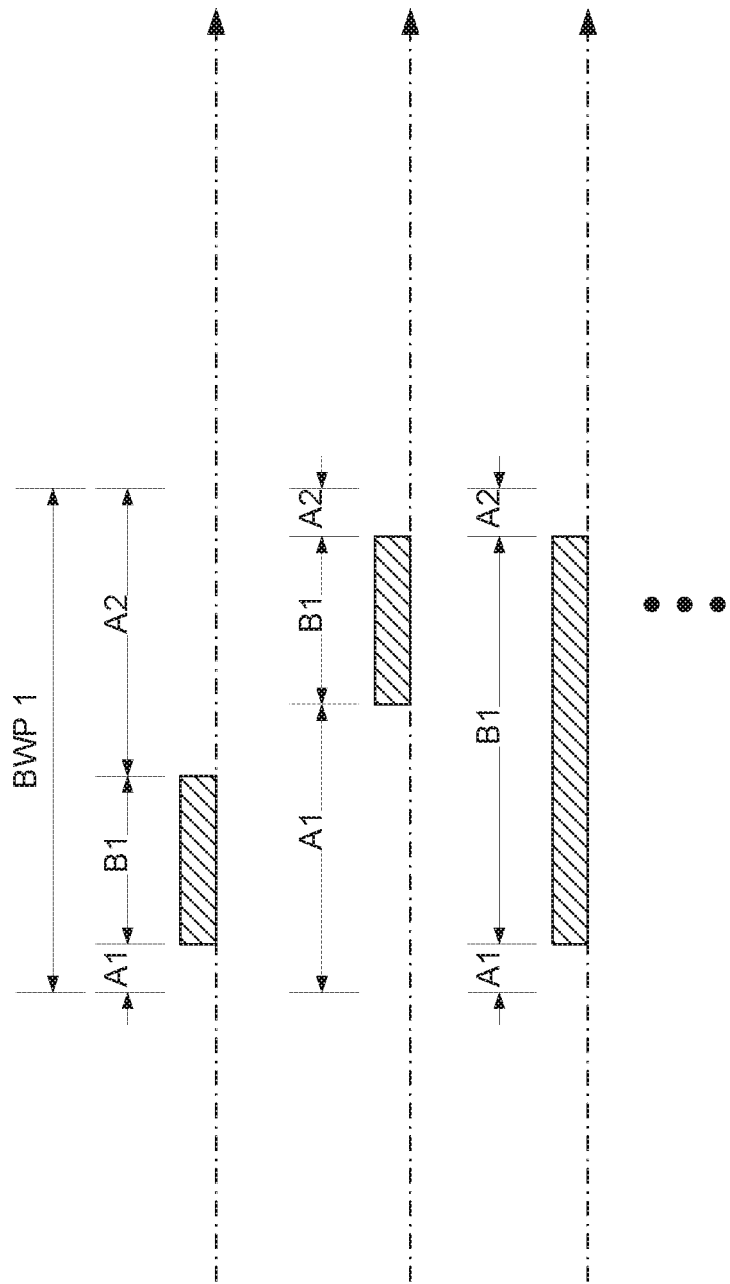

FIG. 5D illustrates an example of a subband combination-based subband configuration. Other subband combination-based subband configurations may be implemented. As shown in FIG. 5D, the subband combination-based subband configuration may be associated with a plurality of subband combinations associated with the BS. Each subband combination may be configured with one or more subbands and one or more associated guard bands for an unlicensed and/or shared frequency band that is operated by the BS.

In some aspects, a subband combination-based subband configuration may configure a single subband combination. In this case, the BS may configure respective subband combination-based subband configurations for each subband combination associated with the BS. In some aspects, a subband combination-based subband configuration may configure one or more subband combinations that are assigned to the UE. In this case, the BS may configure respective subband combination-based subband configurations for each UE that communicatively connects with the BS. In some aspects, a subband combination-based subband configuration for a subband combination may be the same or different for different BWPs associated with the BS, may be the same or different for different cells associated with the BS, and/or the like.

In some aspects, the subbands included in a subband combination may be adjacent and/or contiguous subbands. In this case, the subband combination-based subband configuration may indicate and/or specify the starting RB and ending RB for the contiguous set of subbands. In some aspects, the subbands included in a subband combination may be non-adjacent subbands. In this case, the subband combination-based subband configuration may indicate and/or specify respective starting RBs and respective ending RBs for each subband.

In some aspects, the configuration of subbands and guardbands for each subband combination may be the same configuration or different configurations. In this case, one or more of subbands B1-B5 in a first subband combination may be a different length and/or at a different location in an unlicensed and/or shared frequency band relative to one or more of subbands B1-B5 in a second subband combination or may be the same length and/or location as one or more of subbands B1-B5 in the second subband combination. Similarly, one or more of guard bands A1-A6 in a first subband combination may be a different length and/or at a different location in an unlicensed and/or shared frequency band relative to one or more of guard bands A1-A6 in a second subband combination or may be the same length and/or location as one or more of guard bands A1-A6 in the second subband combination.

For example, FIG. 5D illustrates various example subband combinations configured for a BWP of the BS (e.g., BWP 1). The subband combinations may be configured in respective subband combination-based subband configurations or the same subband combination-based subband configuration. As shown in FIG. 5D, each subband combination may include a subband B1 and guard bands A1 and A2. Moreover, as shown in FIG. 5D, the length and/or location of subband B1 and/or guard bands A1 and A2 may be the same or different across the subband combinations.

Figure 5E:
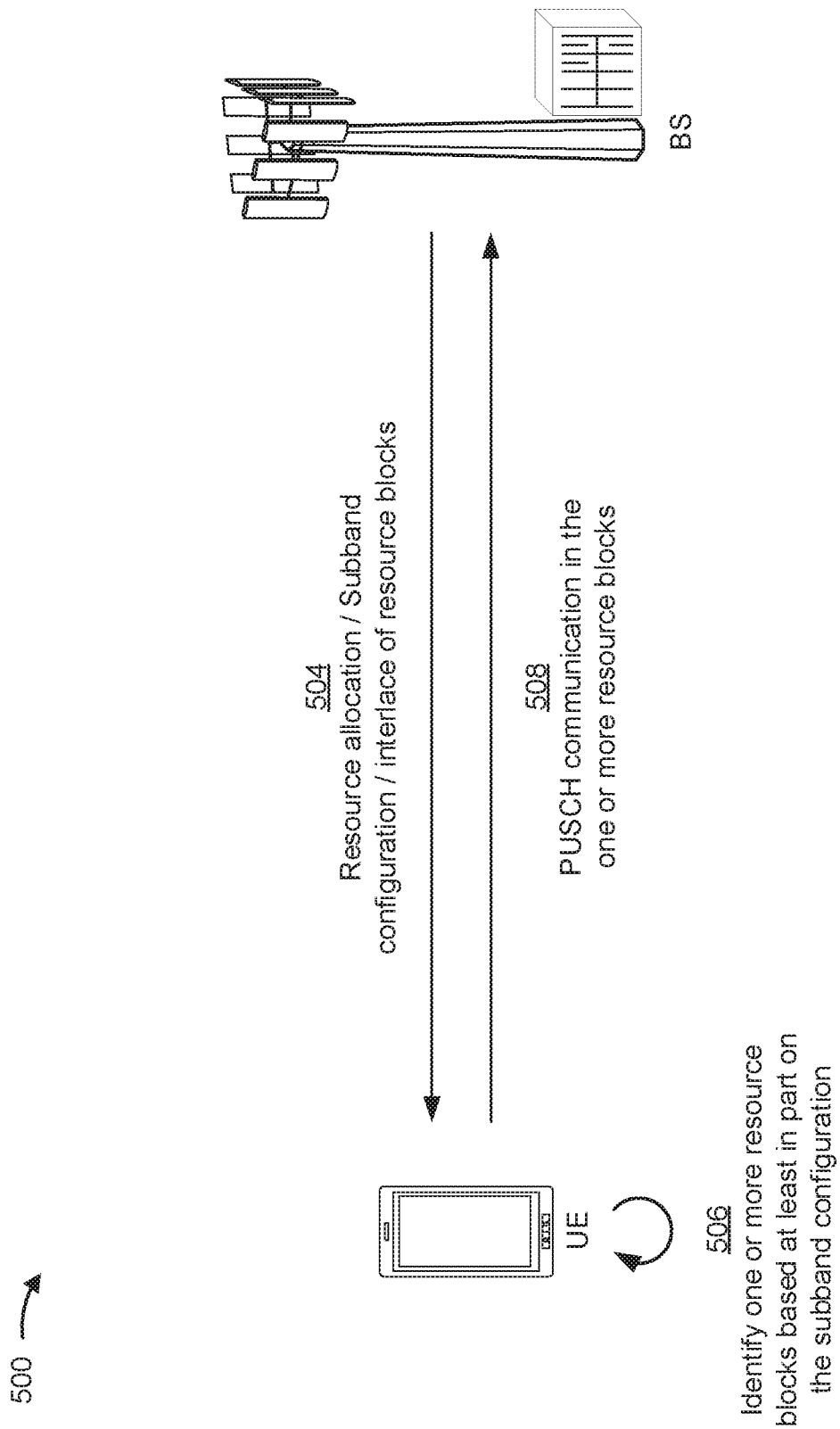

As shown in FIG. 5E, and by reference number 504, the BS may transmit an indication of a resource allocation to the UE. The resource allocation may indicate the time-domain resources (e.g., slots, symbols, and/or the like) and/or the frequency-domain resources that are allocated to the UE. The frequency-domain resources may include a BWP, one or more subbands included in the BWP, and/or the like, that are included in a licensed or unlicensed and/or shared frequency band. Additionally, the BS may transmit an indication of an interlace of resource blocks allocated to the UE.

Moreover, the BS may transmit an indication of a subband configuration for the one or more subbands allocated to the UE. The BS may transmit the indication of the subband configuration based at least in part on the resource allocation, based at least in part on no hard coded or system-wide subband configuration being configured for the wireless network, and/or the like. The subband configuration may include, indicate, and/or specify the length, location, and/or other parameters of the one or more subbands allocated to the UE, the length, location, and/or other parameters of the one or more guard bands associated with the subbands allocated to the UE, and/or the like. As indicated above, the subband configuration may be a cell-based subband configuration, a BWP-based subband configuration, a subband combination-based subband configuration, and/or the like.

In some aspects, the BS may transmit the indication of the resource allocation, the indication of the interlace, and/or the indication of the subband configuration to the UE in one or more communications. The one or more communications may include a master information block (MIB), a SIB, a remaining minimum system information (RMSI) communication, an other system information (OSI) communication, a downlink control information (DCI) communication, a radio resource control (RRC) communication, a PBCH communication, a PDCCH communication, and/or another type of downlink communication. In some aspects, if the subband configuration is a cell-based subband configuration, the BS may transmit the indication of the subband configuration in a cell configuration for the cell. In some aspects, if the subband configuration is a BWP-based subband configuration, the BS may transmit the indication of the subband configuration in a BWP configuration for the BWP.

In some aspects, the BS may configure a plurality of candidate subband configurations in one or more first communications (e.g., a MIB, a SIB, an RMSI communication, an OSI communication, an RRC communication, and/or the like), and the BS may transmit the indication of the subband configuration in one or more second communications (e.g., a medium access control (MAC) control element (MAC-CE) communication, a DCI communication, and/or the like), in which the one or more second communications index into the plurality of candidate subband configurations indicated in the one or more first communications.

As further shown in FIG. 5E, and by reference number 506, the UE may identify one or more resource blocks, in which to transmit a PUSCH communication to the BS. In some aspects, the UE may identify the one or more resource blocks based at least in part on the resource allocation, the subband configuration, and/or the interlace. For example, the UE may identify a first plurality of resource blocks, included in the subbands allocated to the UE, based at least in part on the resource allocation and the subband configuration, may identify a second plurality of resource blocks for interlaced PUSCH transmissions based at least in part on the interlace, and may identify a subset of resource blocks included in both the first plurality of resource blocks and the second plurality of resource blocks as the one or more resource blocks that the UE may use to transmit the PUSCH communication. As further shown in FIG. 5E, and by reference number 508, the UE may transmit, to the BS, the PUSCH communication in the one or more resource blocks that were identified as being permitted for use in transmitting the PUSCH communication to the BS.

In this way, the UE may identify one or more resource blocks, in which to transmit a PUSCH communication, based at least in part on a subband configuration for a plurality of subbands configured for the UE. The subband configuration may indicate and/or include one or more guard bands for the plurality of subbands allocated to the UE, as well as other parameters for the plurality of subbands and/or one or more guard bands. The subband configuration may be hard coded for all subbands across a particular frequency band (e.g., an unlicensed frequency band in an NR-U deployment) or all frequency bands included in a wireless network, may be configured for all subbands on a cell-basis for each BS in the wireless network, may be configured per BWP associated with the BS, may be configured for different combinations of subbands, and/or the like. In this way, the UE is permitted to use the subband configuration to identify the length and/or locations of subbands and/or guard bands for a frequency domain resource allocation assigned to the UE (e.g., in an unlicensed frequency band deployment), which in turn permits the UE to identify the resource blocks that may be used for transmitting PUSCH communications.

As indicated above, FIGS. 5A-5E are provided as one or more examples. Other examples may differ from what is described with respect to FIGS. 5A-5E.

Figure 6:
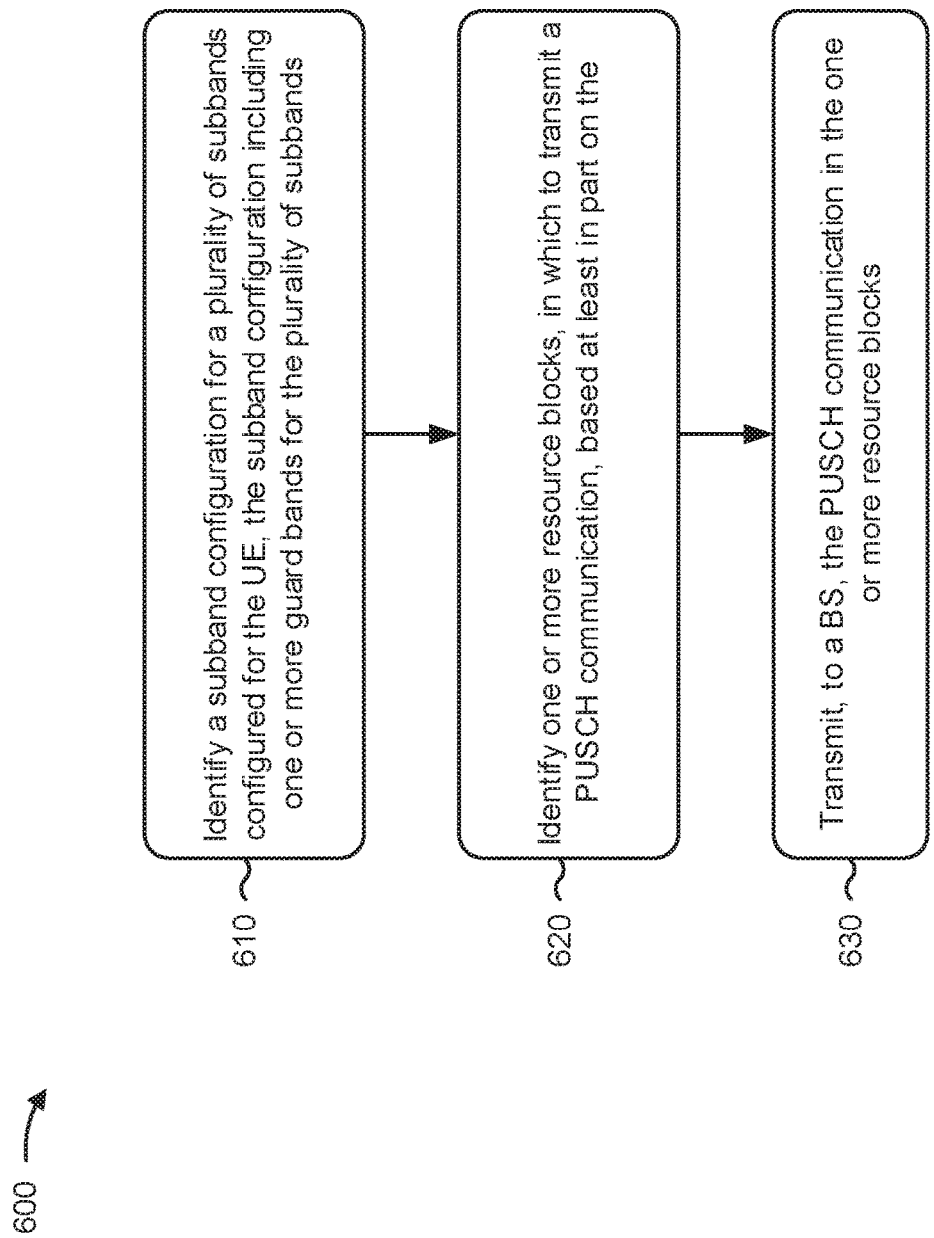
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs operations associated with subband based resource allocation for NR-U.

As shown in FIG. 6, in some aspects, process 600 may include identifying a subband configuration for a plurality of subbands configured for the UE, the subband configuration including one or more guard bands for the plurality of subbands (block 610). For example, the UE (e.g., using receive processor 258, transmit processor 264, controller/processor 280, memory 282, and/or the like) may identify a subband configuration for a plurality of subbands configured for the UE, as described above. In some aspects, the subband configuration including one or more guard bands for the plurality of subbands.

As shown in FIG. 6, in some aspects, process 600 may include identifying one or more resource blocks, in which to transmit a PUSCH communication, based at least in part on the subband configuration (block 620). For example, the UE (e.g., using receive processor 258, transmit processor 264, controller/processor 280, memory 282, and/or the like) may identify one or more resource blocks, in which to transmit a PUSCH communication, based at least in part on the subband configuration, as described above.

As further shown in FIG. 6, in some aspects, process 600 may include transmitting, to a BS, the PUSCH communication in the one or more resource blocks (block 630). For example, the UE (e.g., using receive processor 258, transmit processor 264, controller/processor 280, memory 282, and/or the like) may transmit, to a BS, the PUSCH communication in the one or more resource blocks, as described above.

Process 600 may include additional aspects, such as any single aspect or any combination of aspects described below and/or in connection with one or more other processes described elsewhere herein.

In a first aspect, the plurality of subbands are included in an unlicensed frequency band. In a second aspect, alone or in combination with the first aspect, identifying the one or more resource blocks comprises identifying, based at least in part on the subband configuration, a first plurality of resource blocks included in the plurality of subbands; identifying, based at least in part on an interlace of resource blocks configured for the UE, a second plurality of resource blocks for interlaced PUSCH transmissions; and identifying the one or more resource blocks as a subset of the second plurality of resource blocks that is included in the first plurality of resource blocks.

In a third aspect, alone or in combination with one or more of the first and second aspects, the one or more resource blocks are included in at least one of the plurality of subbands configured for the UE or the one or more guard bands for the plurality of subbands. In a fourth aspect, alone or in combination with one or more of the first through third aspects, the subband configuration is configured for all BSs included in a wireless network in which the UE and the BS are included, the subband configuration configures all subbands and guard bands for all frequency bands that are operated in the wireless network, and identifying the one or more resource blocks comprises identifying the one or more resource blocks based at least in part on the subband configuration being configured for all BSs included in the wireless network and based at least in part on the subband configuration configuring all subbands and guard bands for all frequency bands that are operated in the wireless network.

In a fifth aspect, alone or in combination with one or more of the first through fourth aspects, the subband configuration is configured for a cell of the BS, the subband configuration configures all subbands and guard bands for a frequency band on which the BS operates in the cell, and identifying the one or more resource blocks comprises identifying the one or more resource blocks based at least in part on the UE being served by the cell. In a sixth aspect, alone or in combination with one or more of the first through fifth aspects, the subband configuration is to be applied to each bandwidth part configured by the BS in the cell.

In a seventh aspect, alone or in combination with one or more of the first through sixth aspects, the plurality of subbands and the one or more guard bands are included in a bandwidth part, of the frequency band, assigned to the UE, and a resource block, of the one or more resource blocks, is included in a guard band, of the one or more guard bands, between two subbands of the plurality of subbands. In an eighth aspect, alone or in combination with one or more of the first through seventh aspects, process 600 further comprises receiving, from the BS, an indication of the subband configuration, the indication of the subband configuration being included in a cell configuration for the cell.

In a ninth aspect, alone or in combination with one or more of the first through eighth aspects, the subband configuration is configured for a BWP of a plurality of BWPs associated with the BS, the plurality of subbands and the one or more guard bands are included in the BWP, and identifying the one or more resource blocks comprises identifying the one or more resource blocks based at least in part on the BWP being assigned to the UE. In a tenth aspect, alone or in combination with one or more of the first through ninth aspects, process 600 further comprises receiving, from the BS, an indication of the subband configuration, the indication of the subband configuration being included in a BWP configuration for the BWP.

In an eleventh aspect, alone or in combination with one or more of the first through tenth aspects, the subband configuration indicates respective lengths and respective locations, in the frequency domain, for the plurality of subbands and the one or more guard bands, another subband configuration, configured for another BWP of the plurality of BWPs associated with the BS, indicates at least one of a first length of a subband, of the plurality of subbands, that is different from a second length of the subband indicated in the subband configuration, a first location of the subband that is different from a second location of the subband indicated in the subband configuration, a first length of a guard band, of the one or more guard bands, that is different from a second length of the guard band indicated in the subband configuration, or a first location of the guard band that is different from a second location of the guard band indicated in the subband configuration.

In a twelfth aspect, alone or in combination with one or more of the first through eleventh aspects, the subband configuration is specific to a particular combination of the one or more subbands. In a thirteenth aspect, alone or in combination with one or more of the first through twelfth aspects, process 600 further comprises receiving an indication of the subband configuration from the BS, and identifying the one or more resource blocks comprises identifying the one or more resource blocks based at least in part on receiving the indication of the subband configuration. In a fourteenth aspect, alone or in combination with one or more of the first through thirteenth aspects, receiving the indication of the subband configuration comprises receiving the indication of the subband configuration in at least one of a MIB, a SIB, an RMSI communication, an OSI communication, a DCI communication, or an RRC communication.

In a fifteenth aspect, alone or in combination with one or more of the first through fourteenth aspects, the subband configuration is included in a plurality of subband configurations that is configured for the UE, and the plurality of subband configurations comprise a combination of at least one of a hard coded or system-wide subband configuration, a cell-based subband configuration, a BWP-based subband configuration, or a subband combination-based subband configuration.

In a sixteenth aspect, alone or in combination with one or more of the first through fifteenth aspects, the subband configuration is a hard coded or system-wide subband configuration for all BSs included in a wireless network in which the UE and the BS are included. In a seventeenth aspect, alone or in combination with one or more of the first through sixteenth aspects, the subband configuration is to be applied to each bandwidth part configured by the BS in a cell associated with the BS.

In an eighteenth aspect, alone or in combination with one or more of the first through seventeenth aspects, the subband configuration indicates respective starting resource blocks and respective ending resource blocks for each of the one or more guard bands. In a nineteenth aspect, alone or in combination with one or more of the first through eighteenth aspects, the subband configuration is a hard coded subband configuration or a system-wide subband configuration, and identifying the one or more resource blocks comprises identifying the one or more resource blocks based at least in part on the hard coded subband configuration or the system-wide subband configuration prior to being radio resource control (RRC) configured with a cell-based subband configuration.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
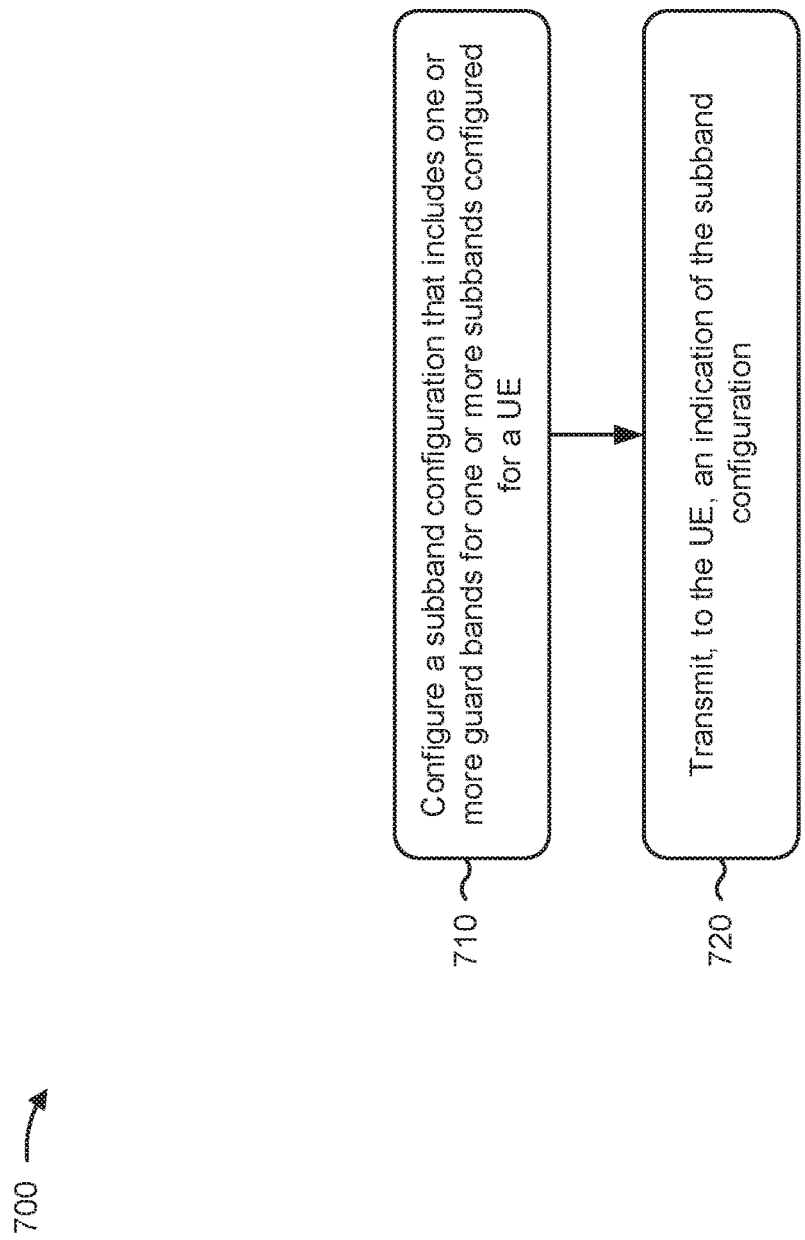
FIG. 7 is a diagram illustrating an example process performed, for example, by a base station (BS), in accordance with various aspects of the present disclosure.

FIG. 7 is a diagram illustrating an example process 700 performed, for example, by a BS, in accordance with various aspects of the present disclosure. Example process 700 is an example where a BS (e.g., BS 110) performs operations associated with subband based resource allocation for NR-U.

As shown in FIG. 7, in some aspects, process 700 may include configuring a subband configuration that includes one or more guard bands for plurality of subbands configured for a UE (block 710). For example, the BS (e.g., using transmit processor 220, receive processor 238, controller/processor 240, memory 242, and/or the like) may configure a subband configuration that includes one or more guard bands for plurality of subbands configured for a UE, as described above.

As further shown in FIG. 7, in some aspects, process 700 may include transmitting, to the UE, an indication of the subband configuration (block 720). For example, the BS (e.g., using transmit processor 220, receive processor 238, controller/processor 240, memory 242, and/or the like) may transmit, to the UE, an indication of the subband configuration, as described above.

Process 700 may include additional aspects, such as any single aspect or any combination of aspects described below and/or in connection with one or more other processes described elsewhere herein.

In a first aspect, the plurality of subbands are included in an unlicensed frequency band. In a second aspect, alone or in combination with the first aspect, process 700 further comprises receiving, from the UE, a PUSCH communication in one or more resource blocks that are based at least in part on the plurality of subbands configured for the UE, the subband configuration, and an interlace of resource blocks configured for the UE. In a third aspect, alone or in combination with one or more of the first and second aspects, the one or more resource blocks are included in at least one of the plurality of subbands configured for the UE, or the one or more guard bands for the plurality of subbands. In a fourth aspect, alone or in combination with one or more of the first through third aspects, configuring the subband configuration comprises configuring the subband configuration for a cell of the BS, and configuring the subband configuration for the cell comprises configuring the subband configuration for all subbands and guard bands for a frequency band on which the BS operates in the cell.

In a fifth aspect, alone or in combination with one or more of the first through fourth aspects, configuring the subband configuration for the cell comprises configuring the subband configuration for each bandwidth part configured by the BS in the cell. In a sixth aspect, alone or in combination with one or more of the first through fifth aspects, transmitting the indication of the subband configuration comprises transmitting the indication of the subband configuration in a cell configuration for the cell. In a seventh aspect, alone or in combination with one or more of the first through sixth aspects, configuring the subband configuration comprises configuring the subband configuration for a BWP of a plurality of BWPs associated with the BS. In an eighth aspect, alone or in combination with one or more of the first through seventh aspects, transmitting the indication of the subband configuration comprises transmitting the indication of the subband configuration in a BWP configuration for the BWP.

In a ninth aspect, alone or in combination with one or more of the first through eighth aspects, the subband configuration indicates respective lengths and respective locations, in the frequency domain, for the plurality of subbands and the one or more guard bands, and process 700 further comprises configuring another subband configuration, for another BWP of the plurality of BWPs associated with the BS, that indicates at least one of a first length of a subband, of the plurality of subbands, that is different from a second length of the subband indicated in the subband configuration, a first location of the subband that is different from a second location of the subband indicated in the subband configuration, a first length of a guard band, of the one or more guard bands, that is different from a second length of the guard band indicated in the subband configuration, or a first location of the guard band that is different from a second location of the guard band indicated in the subband configuration.

In a tenth aspect, alone or in combination with one or more of the first through ninth aspects, configuring the subband configuration comprises configuring the subband configuration for a particular combination of the plurality of subbands. In an eleventh aspect, alone or in combination with one or more of the first through tenth aspects, transmitting the indication of the subband configuration comprises transmitting the indication of the subband configuration in at least one of a MIB, a SIB, an RMSI communication, an OSI communication, a DCI communication, or an RRC communication.

In a twelfth aspect, alone or in combination with one or more of the first through eleventh aspects, the subband configuration is included in a plurality of subband configurations that is configured for the UE, and the plurality of subband configurations comprise a combination of at least one of a hard coded or system-wide subband configuration, a cell-based subband configuration, a BWP-based subband configuration, or a subband combination-based subband configuration.

In a thirteenth aspect, alone or in combination with one or more if the first through twelfth aspects, configuring the subband configuration for the cell comprises configuring the subband configuration for each bandwidth part configured by the BS in a cell associated with the BS. In a fourteenth aspect, alone or in combination with one or more if the first through thirteenth aspects, the subband configuration indicates respective starting resource blocks and respective ending resource blocks for each of the one or more guard bands.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
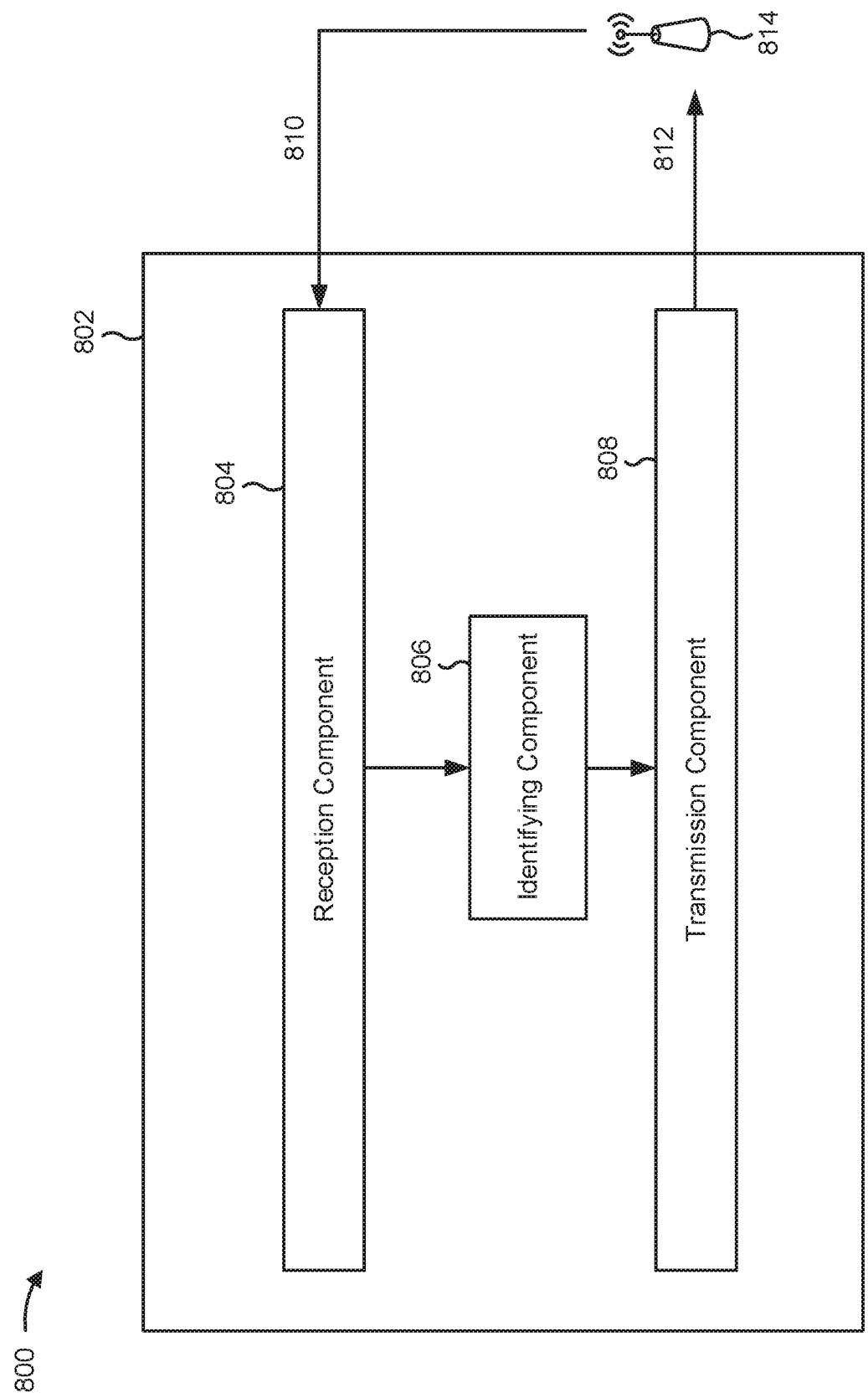
FIGS. 8 and 9 are conceptual data flow diagrams illustrating data flows between different modules/means/components in example apparatuses, in accordance with various aspects of the present disclosure.

FIG. 8 is a conceptual data flow diagram 800 illustrating the data flow between different modules/means/components in an example apparatus 802. The apparatus 802 may be a UE (e.g., UE 120). In some aspects, the apparatus 802 includes a reception component 804, an identifying component 806, and a transmission component 808.

Reception component 804 may receive a communication 810 from a BS 814 (e.g., BS 110). For example, reception component 804 may receive communication 810 that includes an indication of a resource allocation of one or more subbands allocated to apparatus 802, an indication of a subband configuration including one or more guard bands for the one or more subbands, an indication of an interlace of resource blocks allocated to apparatus 802, and/or the like. In some aspects, reception component 804 may include an antenna (e.g., antenna 252), a receive processor (e.g., receive processor 258), a controller/processor (e.g., controller/processor 280), a transceiver, a receiver, and/or the like.

Identifying component 806 may identify one or more resource blocks in which to transmit a PUSCH communication 812 to BS 814. For example, identifying component 806 may identify a the one or more resource blocks based at least in part on the subband configuration and the interlace indicated in communication 810. In some aspects, identifying component 806 may include a processor (e.g., controller/processor 280, receive processor 258, and/or the like).

Transmission component 808 may transmit PUSCH communication 812 to BS 814. For example, transmission component 808 may transmit PUSCH communication 812 to BS 814 in the one or more resource blocks identified by identifying component 806. In some aspects, transmission component 808 may include an antenna (e.g., antenna 252), a transmit processor (e.g., transmit processor 264), a controller/processor (e.g., controller/processor 280), a transceiver, a transmitter, and/or the like.

Apparatus 802 may include additional components that perform each of the blocks of the algorithm in the aforementioned process 600 of FIG. 6 and/or the like. Each block in the aforementioned process 600 of FIG. 6 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of components (e.g., one or more components) shown in FIG. 8 may perform one or more functions described as being performed by another set of components shown in FIG. 8.

Figure 9:
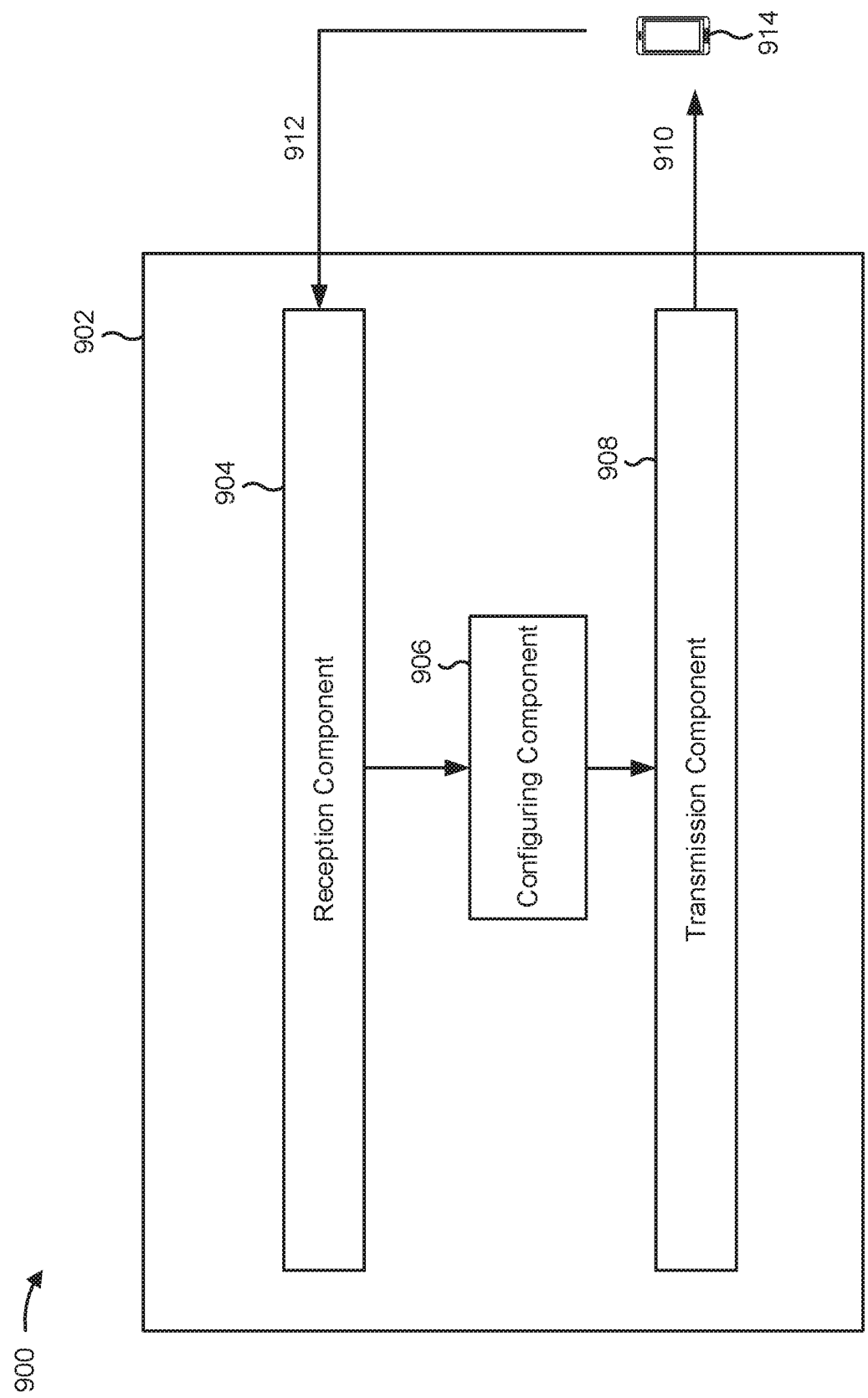

FIG. 9 is a conceptual data flow diagram 900 illustrating the data flow between different modules/means/components in an example apparatus 902. The apparatus 902 may be a base station (e.g., BS 110). In some aspects, apparatus 902 includes a reception component 904, a configuring component 906, and a transmission component 908.

Configuring component 906 may configure a subband configuration that includes one or more guard bands for one or more subbands allocated to a UE 914 (e.g., UE 120). In some aspects, configuring component 906 may include a processor (e.g., a transmit processor 220, a receive processor 238, a controller/processor 240, and/or the like).

Transmission component 908 may transmit a communication 910 to UE 914. Communication 910 may include an indication of the subband configuration and an interlace of resource blocks allocated to UE 914. In some aspects, transmission component 908 may include an antenna (e.g., antenna 234), a transmit processor (e.g., transmit processor 220), a controller/processor (e.g., controller/processor 240), a transceiver, a transmitter, and/or the like.

Reception component 904 may receive a PUSCH communication 912 from UE 914. For example, reception component 904 may receive PUSCH communication 912 in one or more resource blocks that are based at least in part on the one or more subbands allocated to UE 914, the subband configuration indicated in communication 910, and/or the interlace of resource blocks allocated to UE 914. In some aspects, reception component 904 may include an antenna (e.g., antenna 234), a receive processor (e.g., receive processor 238), a controller/processor (e.g., controller/processor 240), a transceiver, a receiver, and/or the like.

Apparatus 902 may include additional components that perform each of the blocks of the algorithm in the aforementioned process 700 of FIG. 7 and/or the like. Each block in the aforementioned process 700 of FIG. 7 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identifying a subband configuration for a plurality of subbands configured for the UE,
        the subband configuration including one or more guard bands for the plurality of subbands, and
        the subband configuration being a hard coded subband configuration or a system-wide subband configuration;
    identifying one or more resource blocks, in which to transmit a physical uplink shared channel (PUSCH) communication, based at least in part on the subband configuration prior to being radio resource control (RRC) configured with a cell-based subband configuration; and
    transmitting, to a base station (BS), the PUSCH communication in the one or more resource blocks.

2. The method of claim 1, wherein the subband configuration is for all BSs included in a wireless network in which the UE and the BS are included.

3. The method of claim 1, wherein the subband configuration is to be applied to each bandwidth part configured by the BS in a cell associated with the BS.

4. The method of claim 1, wherein the subband configuration is configured for a cell of the BS;
    wherein the subband configuration configures all subbands and guard bands for a frequency band on which the BS operates in the cell; and
    wherein identifying the one or more resource blocks comprises:
        identifying the one or more resource blocks based at least in part on the UE being served by the cell.

5. The method of claim 4, further comprising:
    receiving, from the BS, an indication of the subband configuration,
        wherein the indication of the subband configuration is included in a cell configuration for the cell.

6. The method of claim 1, wherein the plurality of subbands are included in an unlicensed frequency band.

7. The method of claim 1, wherein the one or more resource blocks are included in at least one of:

the plurality of subbands configured for the UE, or
the one or more guard bands for the plurality of subbands.

8. The method of claim 1, wherein the subband configuration is configured for a bandwidth part (BWP) of a plurality of BWPs associated with the BS;
wherein the plurality of subbands and the one or more guard bands are included in the BWP; and
wherein identifying the one or more resource blocks comprises:
identifying the one or more resource blocks based at least in part on the BWP being assigned to the UE.

9. The method of claim 8, further comprising:
receiving, from the BS, an indication of the subband configuration,
wherein the indication of the subband configuration is included in a BWP configuration for the BWP.

10. The method of claim 1, wherein the subband configuration indicates respective starting resource blocks and respective ending resource blocks for each of the one or more guard bands.

11. The method of claim 1, further comprising:
receiving an indication of the subband configuration from the BS; and
wherein identifying the one or more resource blocks comprises:
identifying the one or more resource blocks based at least in part on receiving the indication of the subband configuration.

12. A method of wireless communication performed by a base station (BS), comprising:
configuring a subband configuration that includes one or more guard bands for a plurality of subbands configured for a user equipment (UE),
the subband configuration being a hard coded subband configuration or a system-wide subband configuration used for identifying one or more resource blocks, in which to transmit a physical uplink shared channel (PUSCH) communication, prior to the UE being radio resource control (RRC) configured with a cell-based subband configuration; and
transmitting, to the UE, an indication of the subband configuration.

13. The method of claim 12, wherein configuring the subband configuration comprises:
configuring the subband configuration for each bandwidth part configured by the BS in a cell associated with the BS.

14. The method of claim 12, wherein configuring the subband configuration comprises:
configuring the subband configuration for a cell of the BS,
wherein configuring the subband configuration for the cell comprises:
configuring the subband configuration for all subbands and guard bands for a frequency band on which the BS operates in the cell.

15. The method of claim 14, wherein transmitting the indication of the subband configuration comprises:
transmitting the indication of the subband configuration in a cell configuration for the cell.

16. The method of claim 12, wherein the one or more subbands are included in an unlicensed frequency band.

17. The method of claim 12, further comprising:
receiving, from the UE, the PUSCH communication in the one or more resource blocks that are based at least in part on the plurality of subbands configured for the UE and the subband configuration.

18. The method of claim 17, wherein the one or more resource blocks are included in at least one of:
the plurality of subbands configured for the UE, or
the one or more guard bands for the plurality of subbands.

19. The method of claim 12, wherein configuring the subband configuration comprises:
configuring the subband configuration for a bandwidth part (BWP) of a plurality of BWPs associated with the BS.

20. The method of claim 19, wherein transmitting the indication of the subband configuration comprises:
transmitting the indication of the subband configuration in a BWP configuration for the BWP.

21. The method of claim 12, wherein the subband configuration indicates respective starting resource blocks and respective ending resource blocks for each of the one or more guard bands.

22. The method of claim 12, wherein the subband configuration is included in a plurality of subband configurations that is configured for the UE,
wherein the plurality of subband configurations comprise a combination of at least one of:
a bandwidth part (BWP)-based subband configuration, or
a subband combination-based subband configuration.

23. A user equipment (UE) for wireless communication, comprising:
a memory; and
one or more processors operatively coupled to the memory, the memory and the one or more processors configured to:
identify a subband configuration for a plurality of subbands configured for the UE,
the subband configuration including one or more guard bands for the plurality of subbands, and
the subband configuration being a hard coded subband configuration or a system-wide subband configuration;
identify one or more resource blocks, in which to transmit a physical uplink shared channel (PUSCH) communication, based at least in part on the subband configuration prior to being radio resource control (RRC) configured with a cell-based subband configuration; and
transmit, to a base station (BS), the PUSCH communication in the one or more resource blocks.

24. The UE of claim 23, wherein the subband configuration is for all BSs included in a wireless network in which the UE and the BS are included.

25. The UE of claim 23, wherein the subband configuration is to be applied to each bandwidth part configured by the BS in a cell associated with the BS.

26. The UE of claim 23, wherein the subband configuration is configured for a cell of the BS;
wherein the subband configuration configures all subbands and guard bands for a frequency band on which the BS operates in the cell; and
wherein the one or more processors, when identifying the one or more resource blocks, are to:
identify the one or more resource blocks based at least in part on the UE being served by the cell.

27. The UE of claim 26, wherein the one or more processors are to:
receive, from the BS, an indication of the subband configuration,
wherein the indication of the subband configuration is included in a cell configuration for the cell.

28. A base station (BS) for wireless communication, comprising:
a memory; and
one or more processors operatively coupled to the memory, the memory and the one or more processors configured to:
configure a subband configuration that includes one or more guard bands for a plurality of subbands configured for a user equipment (UE),
the subband configuration being a hard coded subband configuration or a system-wide subband configuration used for identifying one or more resource blocks, in which to transmit a physical uplink shared channel (PUSCH) communication, prior to the UE being radio resource control (RRC) configured with a cell-based subband configuration; and
transmit, to the UE, an indication of:
the subband configuration, and
an interlace of resource blocks configured for the UE.

29. The BS of claim 28, wherein the one or more processors, when configuring the subband configuration, are configured to:
configure the subband configuration for each bandwidth part configured by the BS in a cell associated with the BS.

30. The BS of claim 28, wherein the subband configuration indicates respective starting resource blocks and respective ending resource blocks for each of the one or more guard bands.

* * * * *